(12) United States Patent
Lindmeier et al.

(10) Patent No.: US 12,393,330 B2
(45) Date of Patent: Aug. 19, 2025

(54) SYSTEMS, METHODS AND USER INTERFACES FOR OBJECT TRACING

(71) Applicant: Apple Inc., Cupertino, CA (US)

(72) Inventors: William D. Lindmeier, San Francisco, CA (US); Laura Sugden, Redmond, WA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/605,490

(22) Filed: Mar. 14, 2024

(65) Prior Publication Data

US 2024/0319867 A1    Sep. 26, 2024

Related U.S. Application Data

(60) Provisional application No. 63/491,713, filed on Mar. 22, 2023.

(51) Int. Cl.
*G06F 3/04883* (2022.01)
*G06F 3/0354* (2013.01)

(52) U.S. Cl.
CPC ...... *G06F 3/04883* (2013.01); *G06F 3/03545* (2013.01)

(58) Field of Classification Search
CPC ............... G06F 3/03545; G06F 3/0488; G06F 3/04815; G06F 3/011; G06F 3/04883
See application file for complete search history.

(56) References Cited

U.S. PATENT DOCUMENTS

2018/0188939 A1*  7/2018  Alexander .......... G06F 3/04845

OTHER PUBLICATIONS

"AR Plan 3D—Camera to Plan, Floorplanner", GRYMALA [online]. YouTube, 2020 [retrieved on Apr. 25, 2024]. Retrieved from the Internet: <URL: https://www.youtube.com/watch?v=FmOfqclTb9k>.
"Scanning a room with magicplan: a touch-less experience", magicplan The Blueprint blog [online]. [retrieved on Apr. 25, 2024]. Retrieved from the Internet: <URL: https://blog.magicplan.app/ar-room-scan>.

* cited by examiner

*Primary Examiner* — Yaron Cohen
(74) *Attorney, Agent, or Firm* — Kubota & Basol LLP

(57) ABSTRACT

In some embodiments, an electronic device is configured to present user interfaces to facilitate tracing of objects within a three-dimensional environment of the electronic device. In some embodiments, the objects are physical and/or virtual. In some embodiments, the electronic device detects input directed to an input object and displays virtual ink tracing objects in accordance with the input.

20 Claims, 26 Drawing Sheets

100

102a — While a user of an electronic device is at a first viewpoint relative to a three-dimensional environment of the user and an object is visible from the first viewpoint, receive, via one or more input devices, a first input initiating a tracing operation directed to the object.

102b — While the user is at the first viewpoint and while performing the tracing operation, detect, via the one or more input devices, a second input, different from the first input, including movement of an input object, wherein the input object is different from the object.

102c — In response to receiving the second input:

102d — In accordance with a determination that the second input satisfies one or more criteria, including a first criterion that is satisfied when the movement of the input object includes a first movement corresponding to a first surface of the object, display, via the display device, a representation of tracing of the first surface in accordance with the first movement and corresponding to the first surface of the object, wherein the first surface is detected based on depth information associated with the first surface relative to the three-dimensional environment.

FIG. 1

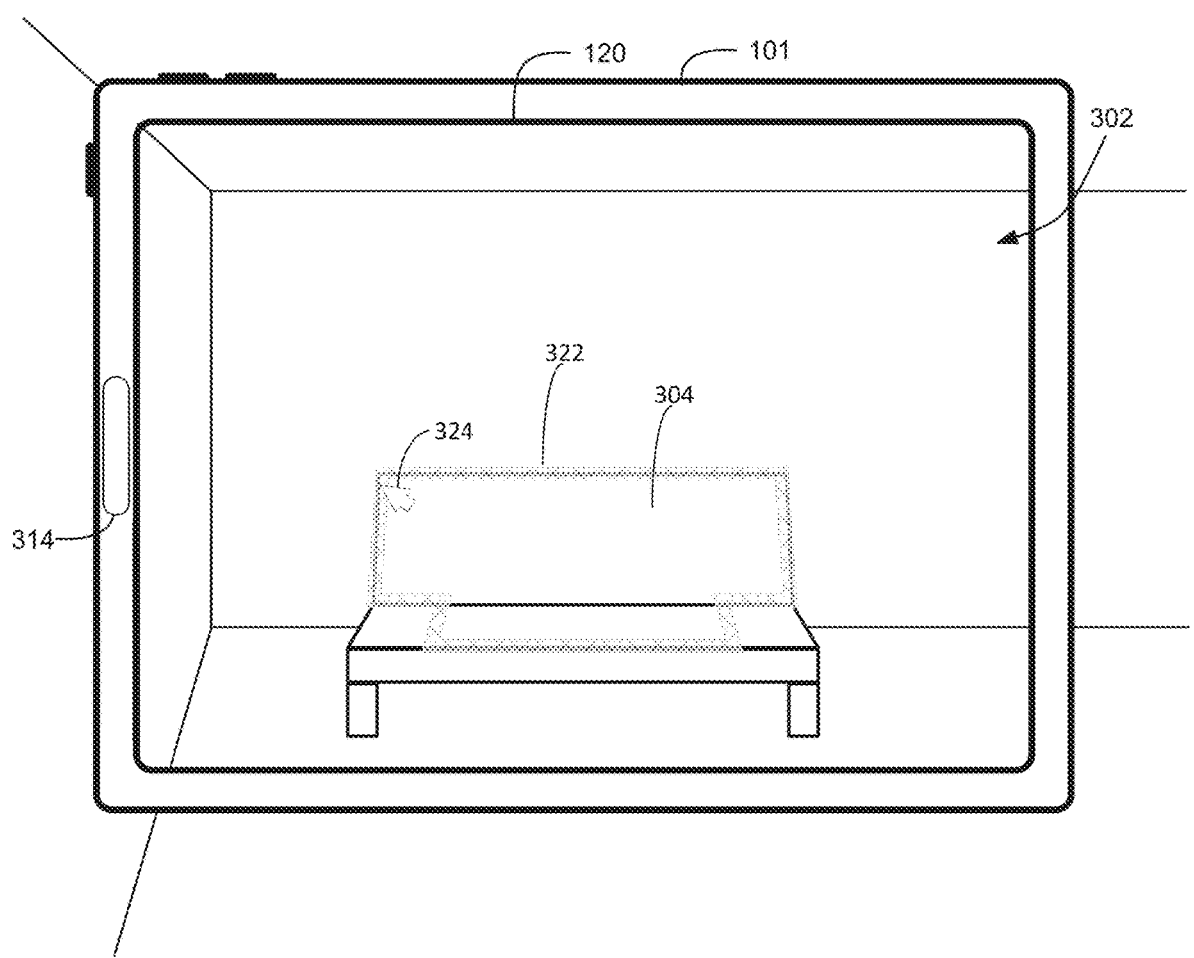
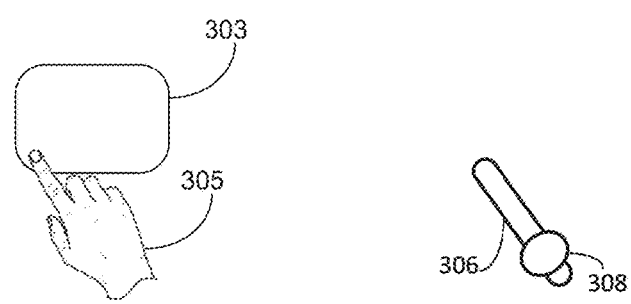
FIG. 3M

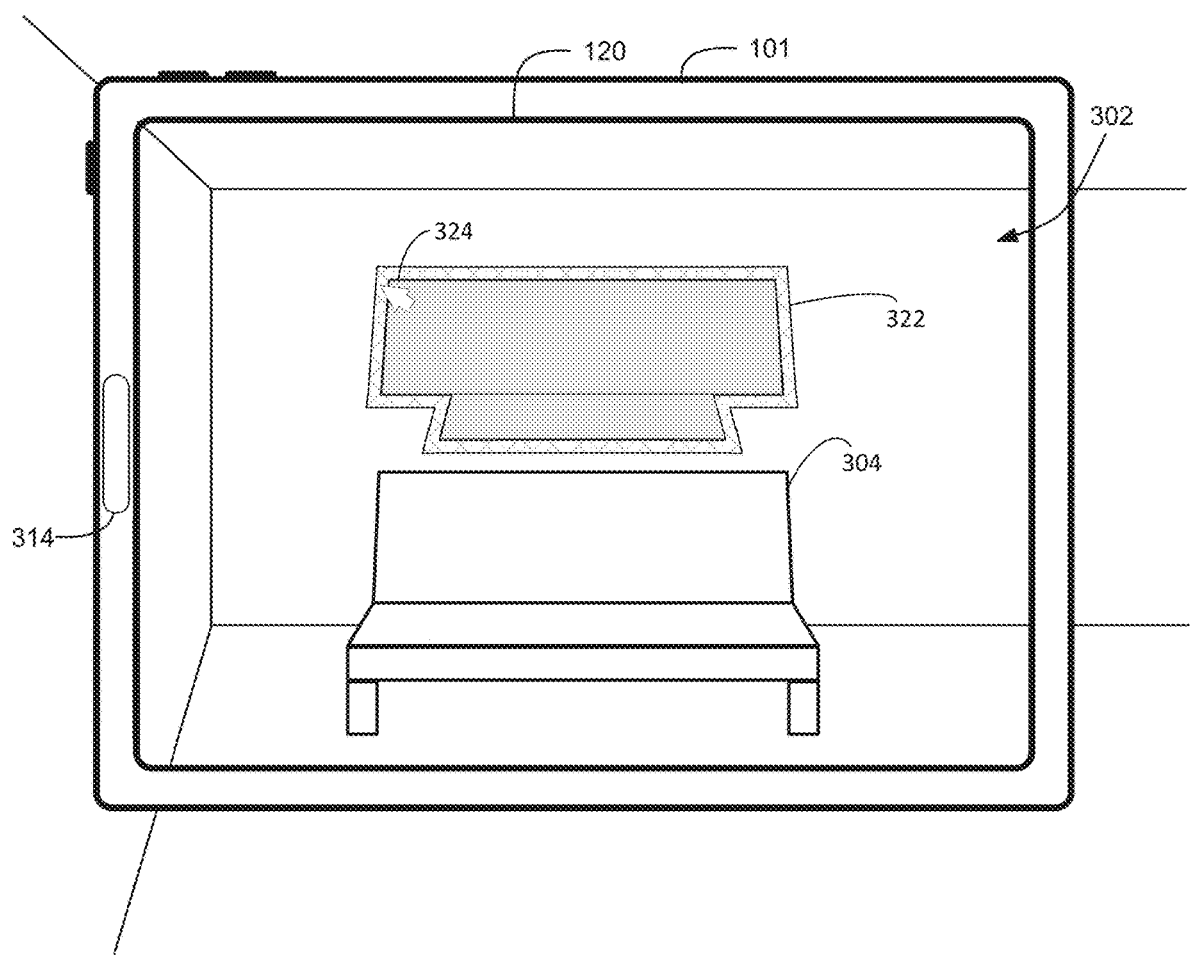
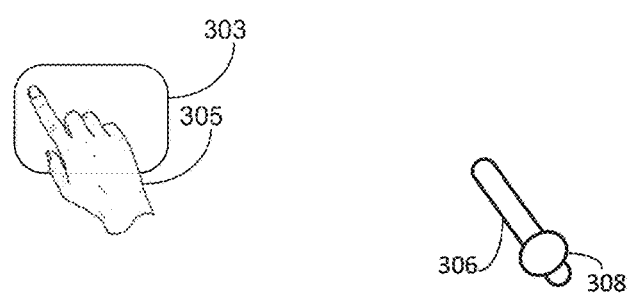
FIG. 3N

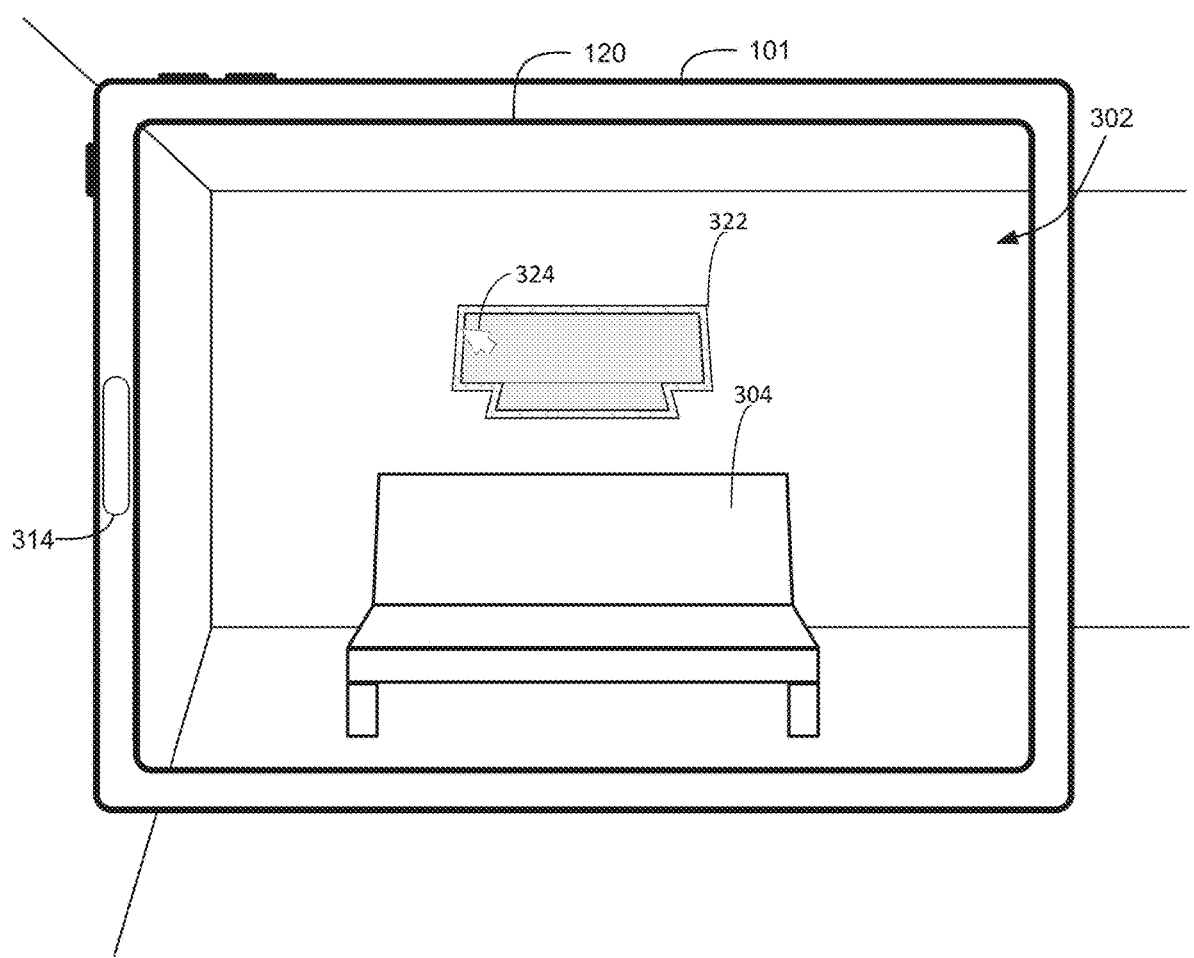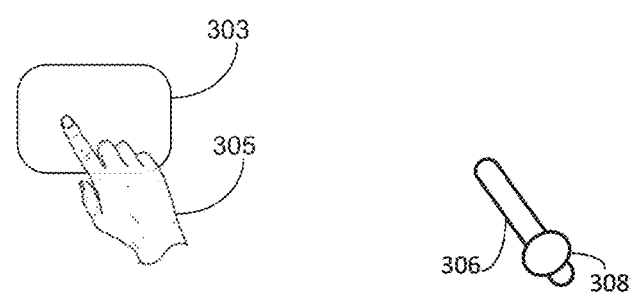
FIG. 3O

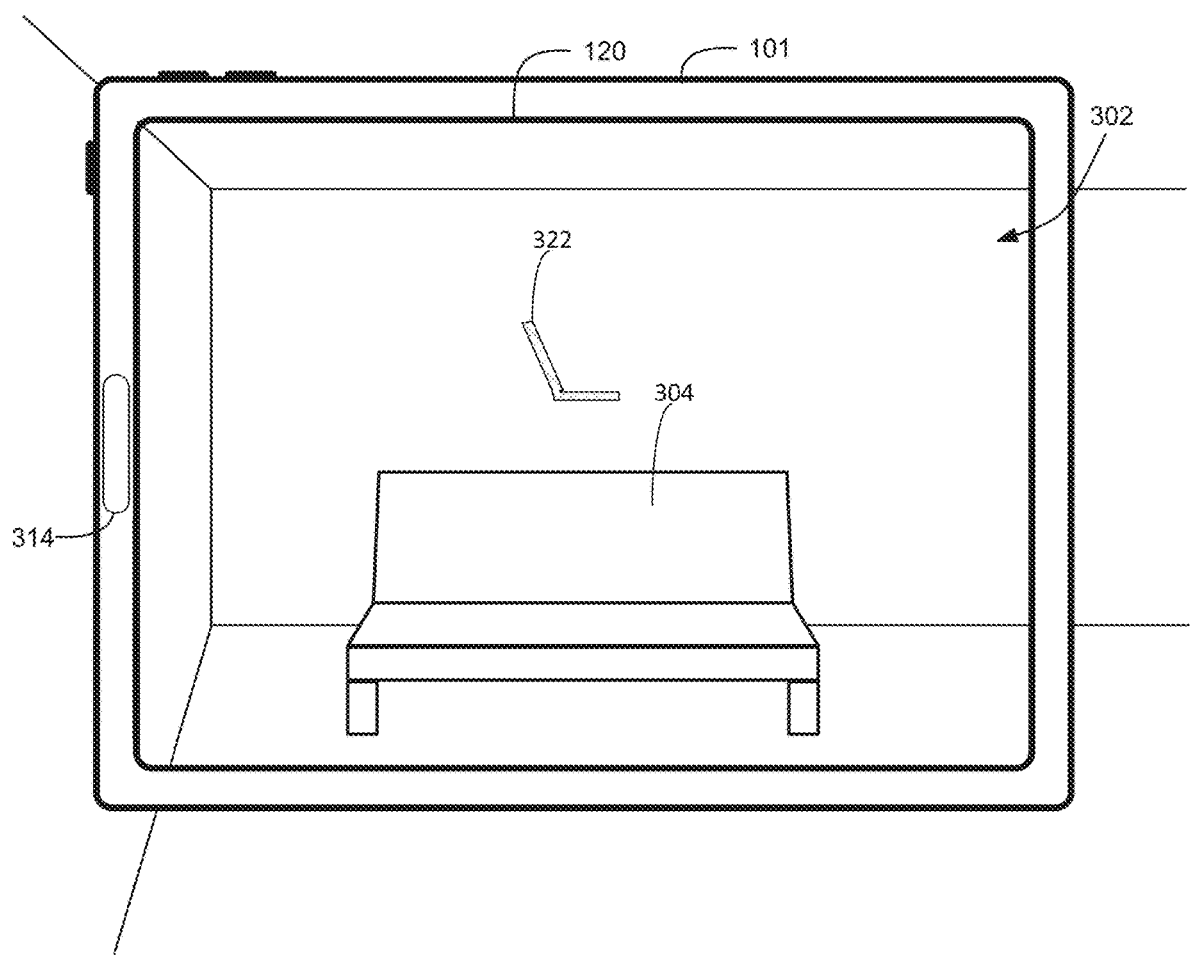
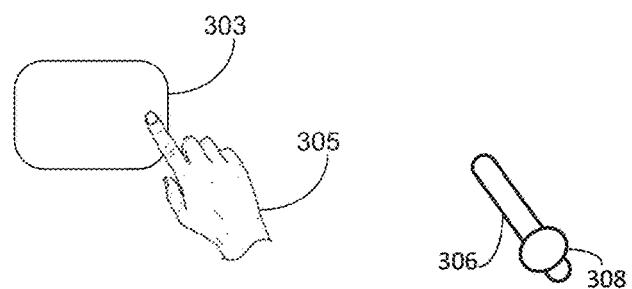
FIG. 3P

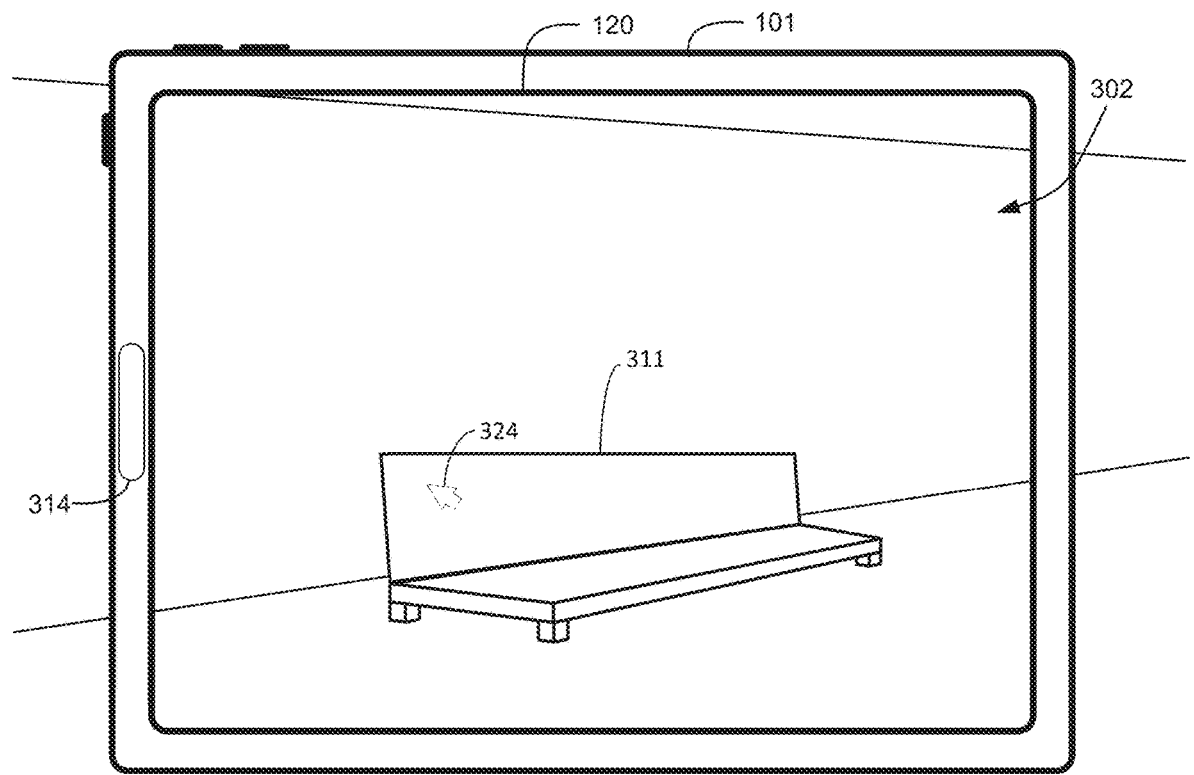
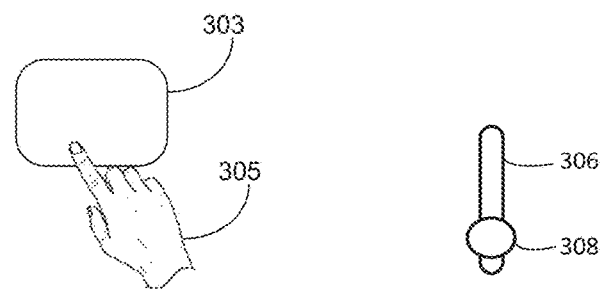
FIG. 3Q

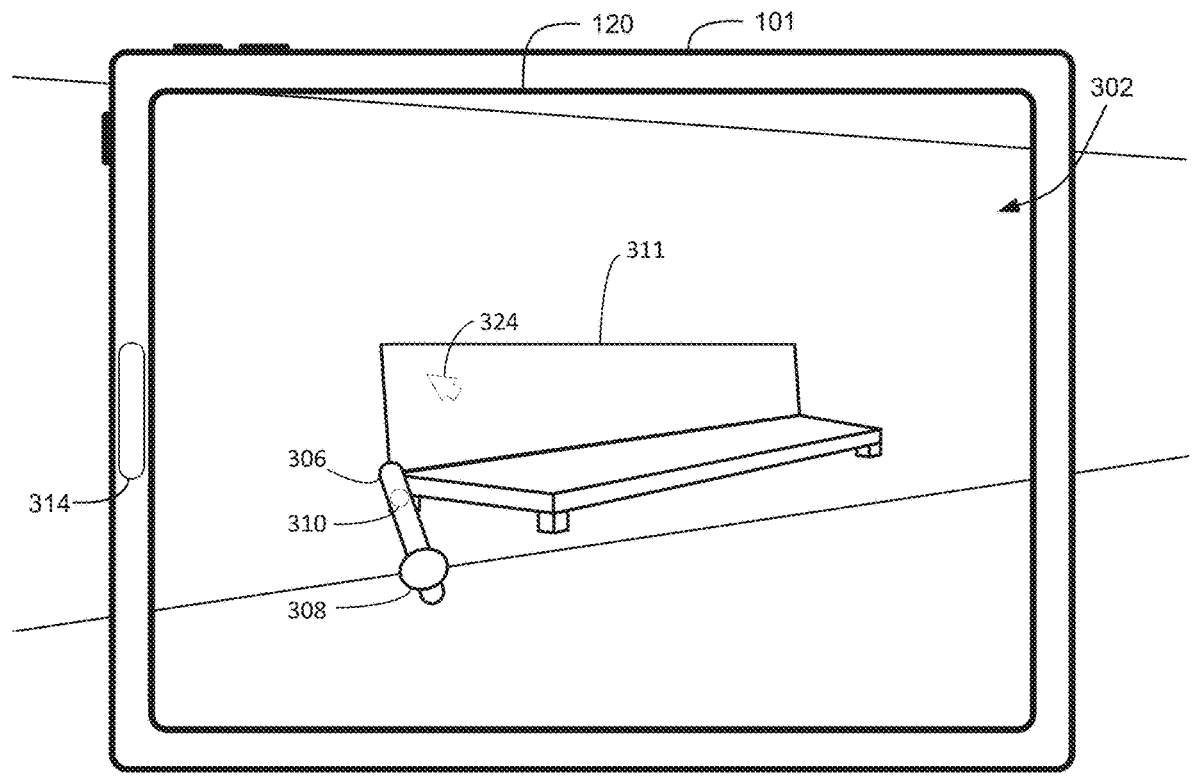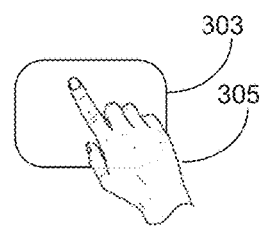
FIG. 3R

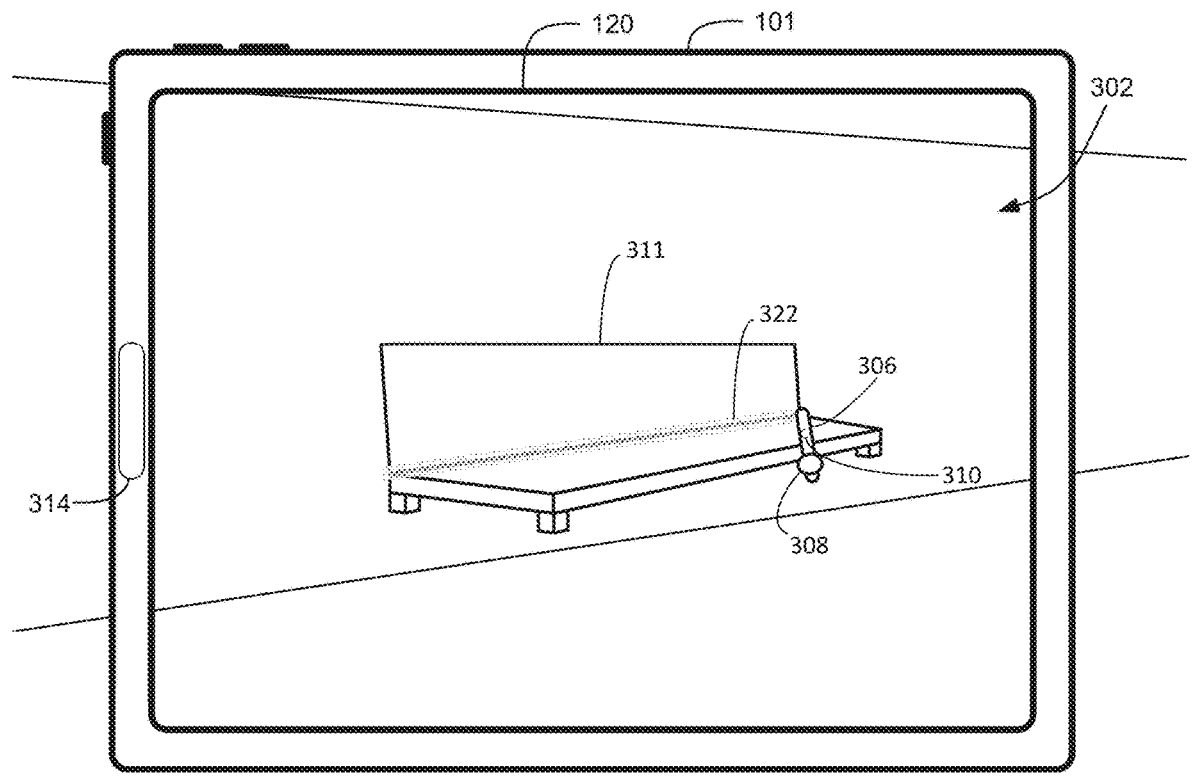
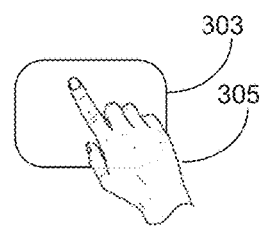
FIG. 3T

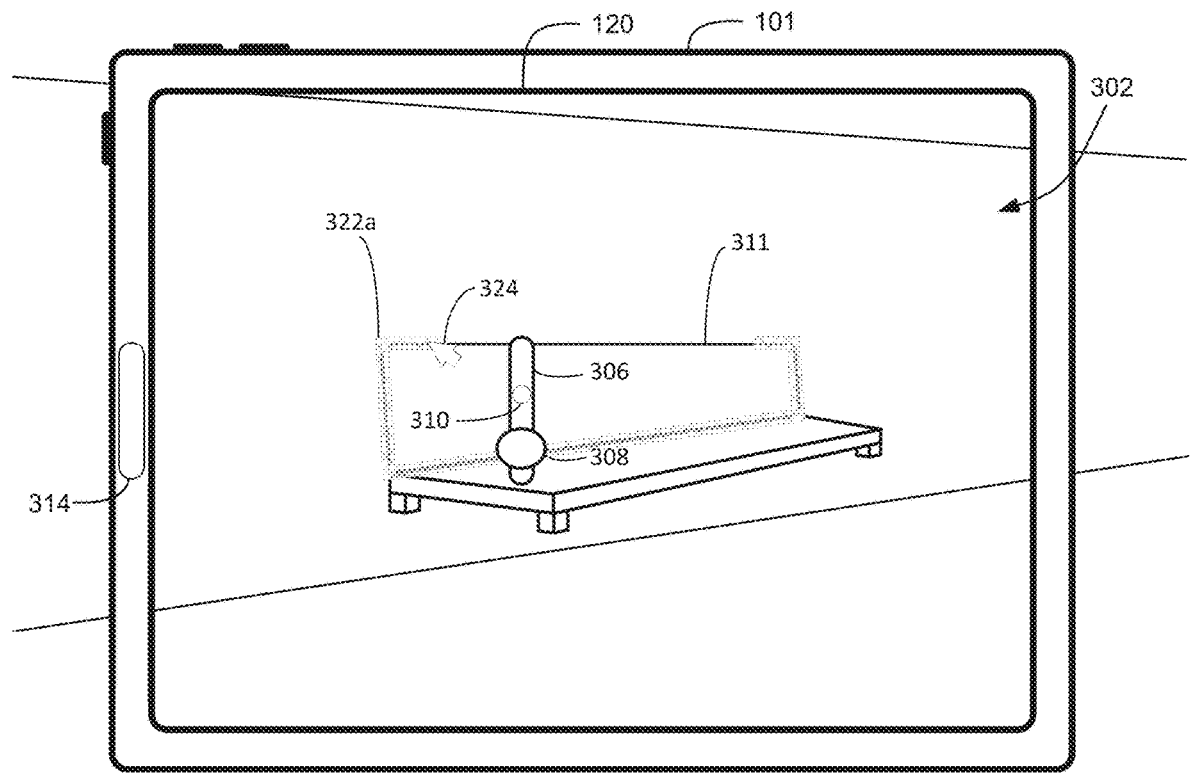
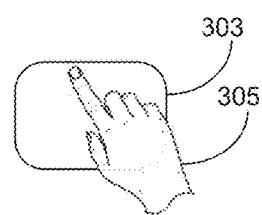
FIG. 3V

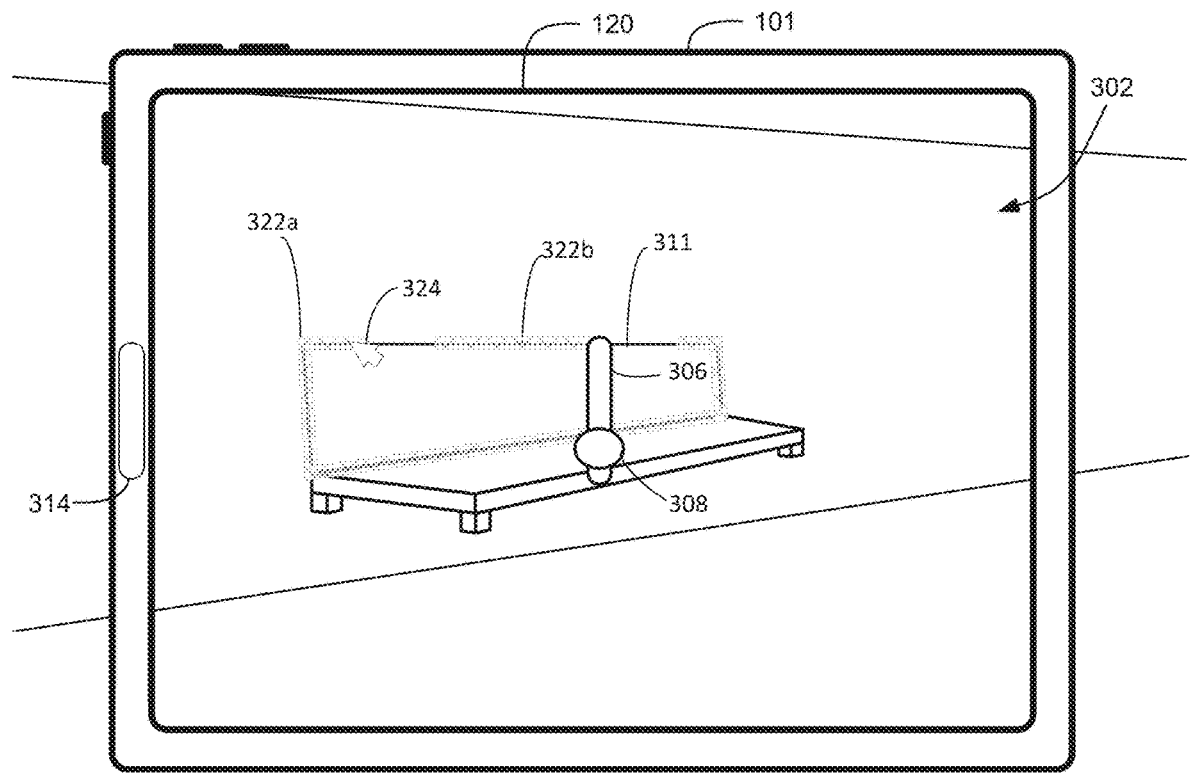
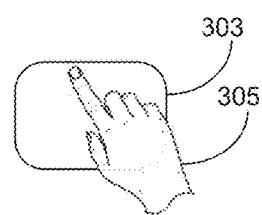
FIG. 3W

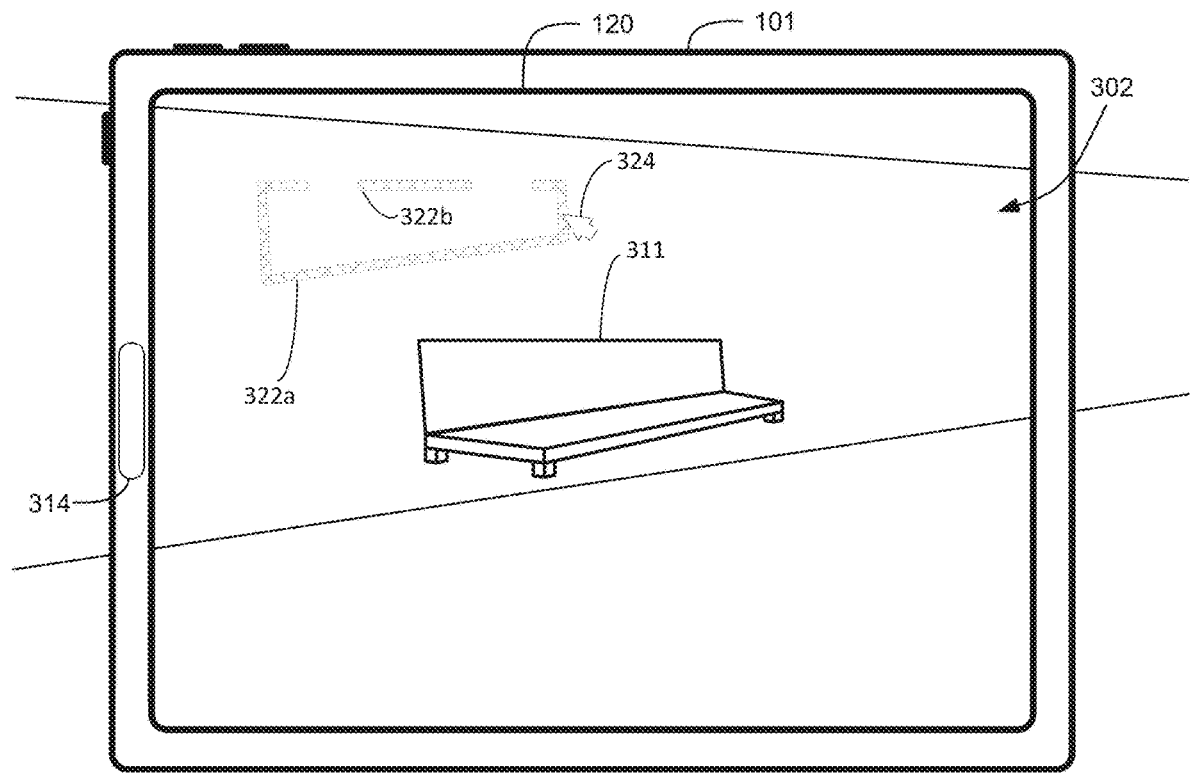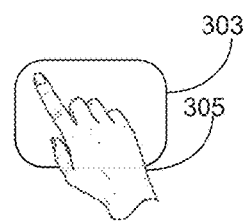
FIG. 3X

SYSTEMS, METHODS AND USER INTERFACES FOR OBJECT TRACING

CROSS-REFERENCE TO RELATED APPLICATIONS

This application claims the benefit of U.S. Provisional Application No. 63/491,713, filed Mar. 22, 2023, the entire disclosure of which is herein incorporated by reference for all purposes.

FIELD OF THE DISCLOSURE

This relates generally to systems, methods, and user interfaces for object tracing.

BACKGROUND OF THE DISCLOSURE

Tracing objects or images is a useful technique to improve artistic and functional replications of portions of such objects or images. Accurately tracing objects, particularly three-dimensional objects, however, can be inefficient, challenging, or even impractical.

SUMMARY OF THE DISCLOSURE

Some embodiments of the disclosure are directed to user interface for tracing objects. In some embodiments, a computer system is configured to display representations of one or more objects within a three-dimensional environment of the computer system. In some embodiments, a computer system is configured to display visual representations of tracing objects, such as virtual ink, in accordance with movement of an input object, such as a hand of the user, a device in communication with the computer system, and/or the hand of the user and the device. In some embodiments, the computer system initiates a tracing mode in response to detecting an initiation input. In some embodiments, while the tracing mode is enabled, virtual ink is displayed along edges, contours, and/or surfaces of an object targeted by tracing based on the movement of the input object. In some embodiments, the tracing is based on a projection of a position of the input object toward the target object. In some embodiments, the computer system displays representations of a depth evaluation region, candidate edges, contours, and/or surfaces, and a current position of tracing of a target object using depth information of the target object relative to a three-dimensional environment. In some embodiments, the computer system uses one or more filters and/or machine learning techniques to identify candidate edges, contours, and/or surfaces for tracing operations. In some embodiments, using the depth information and the one or more filters and/or machine learning techniques, the virtual ink is smoothed to create a simulated magnetic virtual inking of the target object. In some embodiments, the computer system detects one or more inputs to directly trace a target object. In some embodiments, the computer system detects input manipulating a group of a plurality of instances of virtual ink that are contiguous and/or non-contiguous, and in response, concurrently manipulates the group of virtual ink.

BRIEF DESCRIPTION OF THE DRAWINGS

FIG. 1 illustrates an example of a user interface for object tracing according to embodiments of the disclosure.

DETAILED DESCRIPTION

Figure 2:
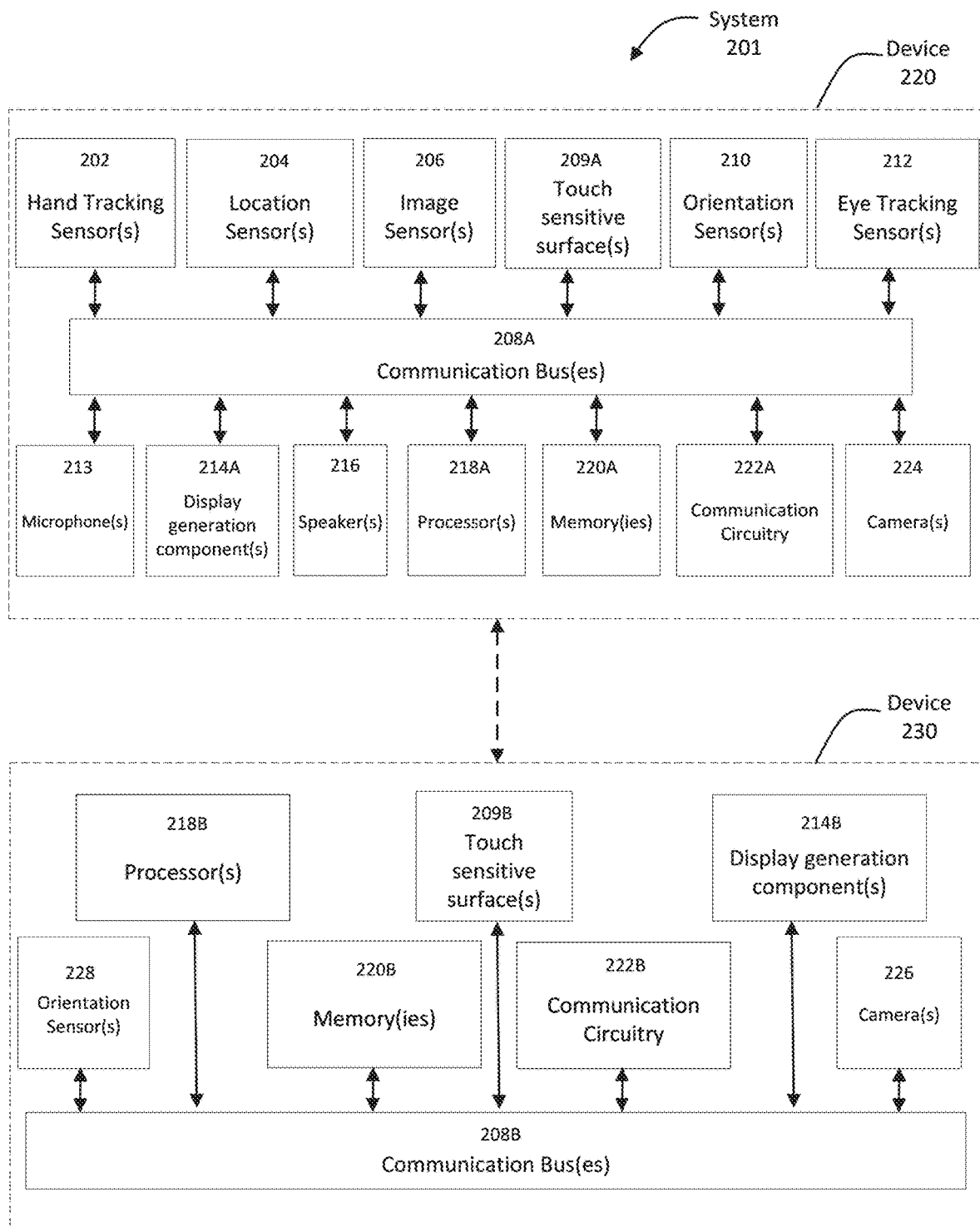
FIG. 2 illustrates a block diagram of an exemplary architecture for a system according to some embodiments of the disclosure.

In the following description of embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

In some embodiments, a computer system is configured to display representations of one or more objects within a three-dimensional environment of the computer system. In some embodiments, a computer system is configured to display visual representations of tracing objects, such as virtual ink, in accordance with movement of an input object, such as a hand of the user, a device in communication with the computer system, and/or the hand of the user and the device. In some embodiments, the computer system initiates a tracing mode in response to detecting an initiation input. In some embodiments, while the tracing mode is enabled, visual ink is displayed along edges, contours, and/or surfaces of an object targeted by tracing based on the movement of the input object. In some embodiments, the tracing is based on a projection of a position of the input object toward the target object. In some embodiments, the computer system displays representations of a depth evaluation region, candidate edges, contours, and/or surfaces, and a current position of tracing of a target object using depth information of the target object relative to a three-dimensional environment. In some embodiments, the computer system uses one or more filters and/or machine learning techniques to identify candidate edges, contours, and/or surfaces for tracing operations. In some embodiments, using the depth information and the one or more filters and/or machine learning techniques, the virtual ink is smoothed to create a simulated magnetic virtual inking of the target object. In some embodiments, the computer system detects one or more inputs to directly trace a target object. In some embodiments, the computer system detects input manipulating a group of a plurality of instances virtual ink that are contiguous and/or non-contiguous, and in response, concurrently manipulates the group of virtual ink.

FIG. 1 illustrates an example of a user interface for object tracing according to embodiments of the disclosure. In some embodiments, method 100 is performed at an electronic device in communication with one or more input devices and a display device. In some embodiments, while an object is visible from a first viewpoint of the electronic device, the electronic device receives (102a), via the one or more input devices, a first input initiating a tracing operation directed to the object. In some embodiments, while performing the tracing operation, the electronic device detects (102b), via the one or more input devices, a second input, different from the first input, including movement of an input object, wherein the input object is different from the object. In response to detecting the second input (102c), in accordance with a determination that the second input satisfies one or more criteria, including a first criterion that is satisfied when the movement of the input object includes a first movement corresponding to a first surface of the object, the electronic device displays (102*d*), via the display device, a representation of tracing of the first surface in accordance with the first movement and corresponding to the first surface of the object, wherein the first surface is detected based on depth information associated with the first surface relative to the three-dimensional environment. In some embodiments, in response to detecting the second input (102*c*), in accordance with a determination that the second input does not satisfy the one or more criteria, the electronic device forgoes the displaying of the representation of tracing of the respective surface.

FIG. 2 illustrates a block diagram of an exemplary architecture for a system 201 according to some embodiments of the disclosure. In some embodiments, system 201 includes multiple devices. For example, the system 201 includes a first electronic device 220 and a second electronic device 230, wherein the first electronic device 220 and the second electronic device 230 are in communication with each other. In some embodiments, the first electronic device 220 and/or the second electronic device 230 are a portable device, such as a mobile phone, smart phone, a tablet computer, a laptop computer, an auxiliary device in communication with another device, a stylus and/or a pointing device having an oblong housing, and/or another suitable electronic device, respectively.

As illustrated in FIG. 2, the first device 220 optionally includes various sensors (e.g., one or more hand tracking sensor(s) 202, one or more location sensor(s) 204, one or more image sensor(s) 206, one or more touch-sensitive surface(s) 209A, one or more motion and/or orientation sensor(s) 210, one or more eye tracking sensor(s) 212, one or more microphone(s) 213 or other audio sensors, etc.), one or more display generation component(s) 214A, one or more speaker(s) 216, one or more processor(s) 218A, one or more memories 220A, and/or communication circuitry 222A. In some embodiments, the second device 230 optionally includes various sensors (e.g., one or more image sensor(s) such as camera(s) 226, one or more touch sensitive surface(s) 209B, and/or one or more motion and/or orientation sensor(s) 228), one or more display generation component(s) 214B, one or more processor(s) 218B, one or more memories 220B, and/or communication circuitry 222B. One or more communication buses 208A and 208B are optionally used for communication between the above-mentioned components of devices 220 and 230, respectively. First device 220 and second device 230 optionally communicate via a wired or wireless connection (e.g., via communication circuitry 222A-222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In some embodiments, memory 220A, 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some embodiments, memory 220A, 220B can include more than one non-transitory computer-readable storage medium.

A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Embodiments of such storage include magnetic disks, optical discs based on CD, DVD, or Blu-ray technologies, as well as persistent solid-state memory such as flash, solid-state drives, and the like.

In some embodiments, display generation component(s) 214A, 214B include a single display (e.g., a liquid-crystal display (LCD), organic light-emitting diode (OLED), or other types of display). In some embodiments, display generation component(s) 214A, 214B includes multiple displays. In some embodiments, display generation component(s) 214A, 214B can include a display with touch capability (e.g., a touch screen), a projector, a holographic projector, a retinal projector, etc. In some embodiments, devices 220 and 230 include touch-sensitive surface(s) 209A and 209B, respectively, for receiving user inputs, such as tap inputs and swipe inputs or other gestures. In some embodiments, display generation component(s) 214A,214B and touch-sensitive surface(s) 209A, 209B form touch-sensitive display(s) (e.g., a touch screen integrated with devices 220 and 230, respectively, or external to devices 220 and 230, respectively, that is in communication with devices 220 and 230).

Devices 220 and/or 230 optionally includes image sensor(s). Image sensors(s) 206A optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras 224 configured to capture movement of physical objects in the real-world environment. Image sensor(s) 206 also optionally include one or more depth sensors configured to detect the distance of physical objects from device 220/230. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, devices 220 and/or 230 use CCD sensors, event cameras, and depth sensors in combination to detect the physical environment around devices 220 and/or 230. In some embodiments, image sensor(s) 206 include a first image sensor and a second image sensor. The first image sensor and the second image sensor work in tandem and are optionally configured to capture different information of physical objects in the real-world environment. In some embodiments, the first image sensor is a visible light image sensor and the second image sensor is a depth sensor. In some embodiments, device 220/230 uses image sensor(s) 206 to detect the position and orientation of device 220/230 and/or display generation component(s) 214A/214B in the real-world environment. For example, device 220/230 uses image sensor(s) 206 to track the position and orientation of display generation component(s) 214A/214B relative to one or more fixed objects in the real-world environment.

In some embodiments, device 220 includes microphone(s) 213 or other audio sensors. Device 220 uses microphone(s) 213 to detect sound from the user and/or the real-world environment of the user. In some embodiments, microphone(s) 213 includes an array of microphones (a plurality of microphones) that optionally operate in tandem, such as to identify ambient noise or to locate the source of sound in space of the real-world environment.

Device 220 includes location sensor(s) 204 for detecting a location of device 220 and/or display generation component(s) 214A. For example, location sensor(s) 204 can include a global positioning system (GPS) receiver that receives data from one or more satellites and allows device 220 to determine the device's absolute position in the physical world.

Device 220 includes orientation sensor(s) 210 for detecting orientation and/or movement of device 220 and/or display generation component(s) 214A. For example, device 220 uses orientation sensor(s) 210 to track changes in the position and/or orientation of device 220 and/or display generation component(s) 214A, such as with respect to physical objects in the real-world environment. Orientation sensor(s) 210 optionally include one or more gyroscopes and/or one or more accelerometers.

Device 220 includes hand tracking sensor(s) 202 and/or eye tracking sensor(s) 212, in some embodiments. Hand tracking sensor(s) 202 are configured to track the position/ location of one or more portions of the user's hands, and/or motions of one or more portions of the user's hands with respect to the extended reality environment, relative to the display generation component(s) 214A, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214A. In some embodiments, hand tracking sensor(s) 202 and/or eye tracking sensor(s) 212 are implemented together with the display generation component(s) 214A. In some embodiments, the hand tracking sensor(s) 202 and/or eye tracking sensor(s) 212 are implemented separate from the display generation component(s) 214A.

In some embodiments, the hand tracking sensor(s) 202 can use image sensor(s) 206 (e.g., one or more IR cameras, 3D cameras, depth cameras, etc.) that capture three-dimensional information from the real-world including one or more hands (e.g., of a human user). In some embodiments, the hands can be resolved with sufficient resolution to distinguish fingers and their respective positions. In some embodiments, one or more image sensor(s) 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some embodiments, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some embodiments, both eyes are tracked separately by respective eye tracking cameras and illumination sources, and a focus/gaze can be determined from tracking both eyes. In some embodiments, one eye (e.g., a dominant eye) is tracked by a respective eye tracking camera/illumination source(s).

Device 220/230 and system 201 are not limited to the components and configuration of FIG. 2, but can include fewer, other, or additional components in multiple configurations. In some embodiments, system 201 can be implemented in a single device. A person or persons using device 220/230 or system 201, is optionally referred to herein as a user or users of the device(s). Attention is now directed towards example graphical user interfaces for object tracing in accordance with input directed to an input object (e.g., corresponding to and/or including device 230) in a three-dimensional environment presented via a second electronic device (e.g., corresponding to device 220).

Figure 3A:
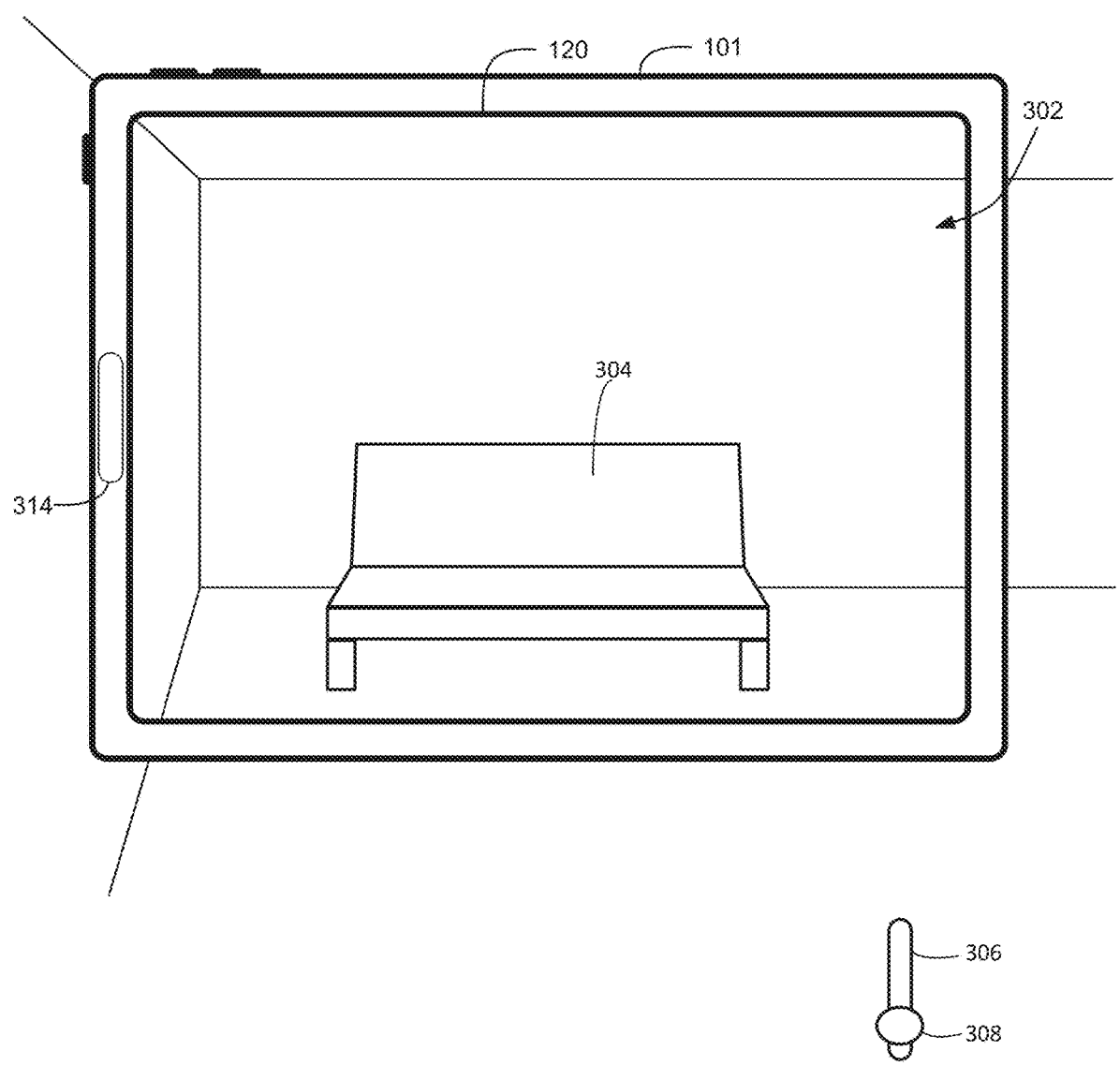
FIGS. 3A-3X illustrates embodiments of object tracing and a user interface for object tracing according to embodiments of the disclosure.

FIGS. 3A-3X show embodiments of magnetic tracing operations according to some embodiments of the disclosure. In some embodiments, a computer system detects one or more inputs from an input object to initiate a tracing operation of an object within an extended reality environment. The input object is optionally a pointing device similar to a stylus and/or a portion of a body of a user of the computer system, such as a hand of the user. In response to the one or more inputs, the computer system optionally displays visual representations such as virtual ink tracing features of the object. In some embodiments, the computer system displays the virtual ink overlaying and/or along the aspects of the object based on movement of the input object detected while the input object is oriented toward the object. In some embodiments, the computer system displays the virtual ink without detecting direct contact between the input object and the traced object-referred to herein as indirect tracing. In some embodiments, the computer system displays the visual representations along edges, surfaces, and/or contours of the object using a "magnetic" tracing effect to suppress variations in the virtual ink that otherwise would cause an undesired jagged appearance and/or deviations away from the edges, surfaces, and/or contours of the object, thus improving indirect tracing operations. The magnetic tracing effect is similar to as if a simulated drawing implement was magnetically attracted to the edges, surfaces, and/or contours and disposing virtual ink along the aspects of the object (e.g., while the input object is generally oriented toward the object). The magnetic tracing effect optionally improves smoothness of the visual representations following the aspects of the object, thereby improving the fidelity of the tracing operation. In some embodiments, the computer system displays the visual representation of tracing based on detected contact between the input object and a physical object or simulated contact between the input object and a virtual object, similar to the effect of disposing ink over a real-world object using a physical pen or marker, referred to herein as direct tracing.

As shown in FIG. 3A, in some embodiments, a computer system 101 is configured to present a three-dimensional environment of a user of the computer system, and further is configured to present a user interface associated with tracing one or more objects within the three-dimensional environment. For example, computer system 101 optionally displays a three-dimensional environment 302 (e.g., a mixed-reality environment) including a view of the user's physical environment, one or more physical objects in the user's physical environment, one or more virtual objects, and one or more graphical user interface elements (e.g., icons, menus, and/or selectable options associated with the mixed-reality environment and/or the one or more objects). In FIG. 3A, sofa 304 corresponds to a first physical object (e.g., a sofa) or a virtual object visible in the environment of the user. It is understood that descriptions of sofa 304 as a sofa are exemplary, and description of such objects and/or tracing of such objects is broadly applicable to other objects (physical and/or virtual) visible in the three-dimensional environment.

In some embodiments, computer system 101 is a device and/or system including one or more processing units. In some embodiments, computer system 101 corresponds to or is included in a head-mounted device (HMD). In some embodiments, computer system 101 includes display generation component 120 and/or one or more input devices such as one or more sensors 314 (e.g., as described further with reference to FIG. 2) to detect aspects of a physical environment of the user. Such one or more sensors are optionally configured to detect a position of portions of the user's body, such as one or more resistive, capacitive, physiological, electromagnetic, acoustic, mechanical, electromechanical, and/or other suitable sensors configured to detect a posture and/or position of the user's head, hands, fingers, neck, eyes, and/or other suitable body parts relative to each other and relative to the physical environment, as described with reference to FIG. 2. As an additional example, computer system 101 optionally corresponds to one or more processors included in a processing module of a head-mounted device, the display generation component 120 optionally corresponds to an electronic display or a projecting unit included in the head-mounted device, and the one or more sensors correspond to one or more sensors configured to track gaze of the user and/or movement of the user's body included in computer system 101, and/or included in a separate computer system that is communicatively coupled to computer system 101.

In some embodiments, the display generation component 120 is configured to provide an extended reality (XR) experience (e.g., at least a visual component of the XR experience) to the user. In some embodiments, the display generation component 120 includes a suitable combination of software, firmware, and/or hardware. In some embodiments, the display generation component is worn on a part of the user's body (e.g., on his/her head or on his/her hand). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards a scene of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene or a part of the user's body (e.g., the user's eye(s), head, or hand)) could similarly be implemented with an HMD where the movement is caused by movement of the HMD relative to the physical environment (e.g., the scene or a part of the user's body (e.g., the user's eye(s), head, or hand)).

In some embodiments, the computer system tracks a position and/or orientation of one or more input objects to perform tracing operation(s) of one or more of the objects visible within the three-dimensional environment. For example, as described further below, the input object(s) optionally include one or more electronic devices, computer systems, and/or portions of a body of the user of the computer system. In some embodiments, the computer system detects movement of the input object(s) and displays visual representations of tracing-such as the virtual ink described previously—in accordance with the movement of the input object(s) and a pointing direction of the input object(s).

In some embodiments, the computer system detects a position of one or more electronic devices and/or computer systems to perform tracing operation(s). For example, device 306 is optionally an input object corresponding to one or more electronic devices and/or computer systems in communication with computer system 101. Device 306 optionally corresponds to a stylus, a pointing device, and/or a wearable device such as a ring or finger tip cover, optionally including one or more characteristics and/or sensors described with reference to device 230 in FIG. 2. In some embodiments, computer system 101 detects and/or receives one or more indications of a position and/or an orientation of one or more portions of device 306. For example, computer system 101 optionally detects a position, velocity, orientation, and/or other relevant kinematic information of a portion of device 306, such as a tip of a pointing device, a tip of a wearable thimble device, a barrel of a stylus device and/or a tip of the stylus device, and/or another portion of such a device 306. The detecting is optionally performed by one or more sensors included in the computer system 101—such as one or more cameras, acoustic sensors, capacitive sensors, and/or electromagnetic sensors—and/or is performed based on information from the device 306. In some embodiments, device 306 includes one or more sensors similar or the same as included in computer system 101. In some embodiments, device 306 determines its position and/or orientation relative to the three-dimensional environment, and communicates information indicating the position and/or orientation of device 306 to computer system 101.

In some embodiments, in response to detecting changes in position, velocity, orientation, and/or other kinematic information, computer system 101 optionally updates its understanding of a current, previous, and possible future orientation(s) of device 306. In some embodiments, changes in position, velocity, orientation, and/or other kinematic information are used to determine a pointing direction of the input object while the input object is stationary and/or while the input object moves in space. In some embodiments, computer system 101 initiates one or more operations (e.g., tracing operations) in response to an initiation input. In some embodiments, the initiation input is one or more air gestures (e.g., a shaking of device 306 by a hand), maintenance of an orientation of device 306 within a threshold of an initial orientation with respect to the three-dimensional environment (e.g., holding a pointing direction of device 306 stable), or a touch (e.g., tap, double tap, tap and hold, etc.) or button input directed to device 306 by object 308 (e.g., a finger of a hand).

In some embodiments, computer system 101 tracks a position of one or more portions of a user's body as an input object. For example, computer system 101 optionally tracks a position of one or more respective portions of object 308. Object 308 optionally corresponds to a respective portion of the user, such as one or more hands, fingers, wrists, knuckles, arms, elbows, and/or other portions of the user's body. For example, computer system 101 optionally tracks a portion of one or more fingers of one or more hands of the user. In some embodiments, a pointing direction of a particular finger in a particular pose is used to direct tracing operations. For example, a hand pointing with an index finger can be detected by computer system 101 and the pointing direction of the finger and/or movement of the hand/finger can be used for tracing operations in a similar manner as described herein for device 306.

In some embodiments, computer system 101 detects and/or receives one or more indications of detection of gestures performed by the one or more fingers in air. Such gestures optionally include one or more poses and/or movements of the one or more fingers/hands. In some embodiments, computer system 101 initiates one or more operations (e.g., tracing operations) in response to an initiation input. For example, computer system 101 optionally detects maintenance of a particular pose (e.g., a hand pointing with an index finger) directed at or within a threshold of an initial orientation with respect to the three-dimensional environment (e.g., holding a pointing direction of a pointer finger stable). As another example, computer system 101 optionally detects a pinch pose optionally including a contacting of a first and a second finger, such as an index finger and a thumb, of a user's hand (e.g., using the index finger involved in the pinch pose as the pointing direction). In some embodiments, the initiation input includes a sequence of gestures. In some embodiments, computer system 101 detects that a gesture has been maintained for a threshold amount of time (e.g., 0.01, 0.05, 0.1, 0.5, 1, 5, 10, 50, 100, or 500 seconds). It is understood that the embodiments described herein are merely exemplary and not limiting in any way. It is further understood that one or more operations performed based on the characteristics of object 308 are similar or the same as the one or more operations of performed based on the characteristics of device 306, according to the embodiments described herein. For example, computer system 101 optionally initiates one or more operations in response to contact 310 (shown in FIG. 3B) detected on a housing of device 306 and/or in response to detecting and/or in accordance with receiving an indication of detection of a gesture performed by object 308. In some embodiments, an input object comprises device 306 and/or object 308.

To generate artistic representations, blueprints, measurements of objects, functional and digital representations of one or more dimensions of objects within the environment, the computer system optionally displays one or more user interfaces to improve user experience for tracing portions of objects (e.g., tracing a curve in one or more dimensions). As a non-limiting example, a user of the computer system optionally generates a wireframe model tracing one or more portions of furniture (e.g., sofa 304) within their physical environment for exporting to computer-aided design software for refinement, iteration, and/or fabrication of other physical products. Additionally or alternatively, when the user of the computer system optionally traces a virtual object, the computer system optionally communicates information representative of the tracing in a relatively lower data communication package (e.g., compared to communicating the virtual object itself) to another computer system and/or for fabrication as a real-world product. In some embodiments, a visual representation of tracing of an object (e.g., a physical or virtual object) is displayed, moved, and/or reoriented within a representation of a physical environment to assist the user in understanding how a physical object corresponding to the traced representation of the object would fit within the dimensions of their physical environment. In some embodiments, tracing a physical object generates one or more virtual objects that are inserted into a virtual experience, such as an immersive virtual reality experience.

In some embodiments, the initiation input causes entry into a tracing mode. For example the initiation input optionally includes as a selection of a virtual button displayed by the computer system 101, a physical button included in the computer system 101, and/or physical buttons included at the device 306, one or more contacts on a housing of device 306 such as contact 310, and/or performance of a gesture by a respective portion of the user's body (e.g., an pinch gesture or pointing gesture in air and/or an gesture moving device 306). In some embodiments, in response to detecting the initiation input, computer system 101 initiates display of representations of tracing (e.g., inking) and/or other visual indication(s) to facilitate such tracing (e.g., a user interface or user interface element corresponding to object 316).

As described herein, in some embodiments, computer system 101 displays one or more visual indication(s) to facilitate such tracing. For example, computer system 101 displays object 316, optionally a circle or disc shaped region (or any other suitable shape) to indicate a position of device 306 relative to the three-dimensional environment of the user. In some embodiments, the object 316 is displayed with an at least partially translucent appearance and/or a modified saturation and/or brightness relative to the three-dimensional environment. In some embodiments, the visual indication position and/or orientation of object 316 is based on the position and/or orientation of the one or more input objects. For example, object 316 is optionally displayed at a depth within the three-dimensional environment corresponding to a projection of a portion of device 306 (e.g., the tip of a housing of device 306) to a position within the three-dimensional environment.

Figure 3B:
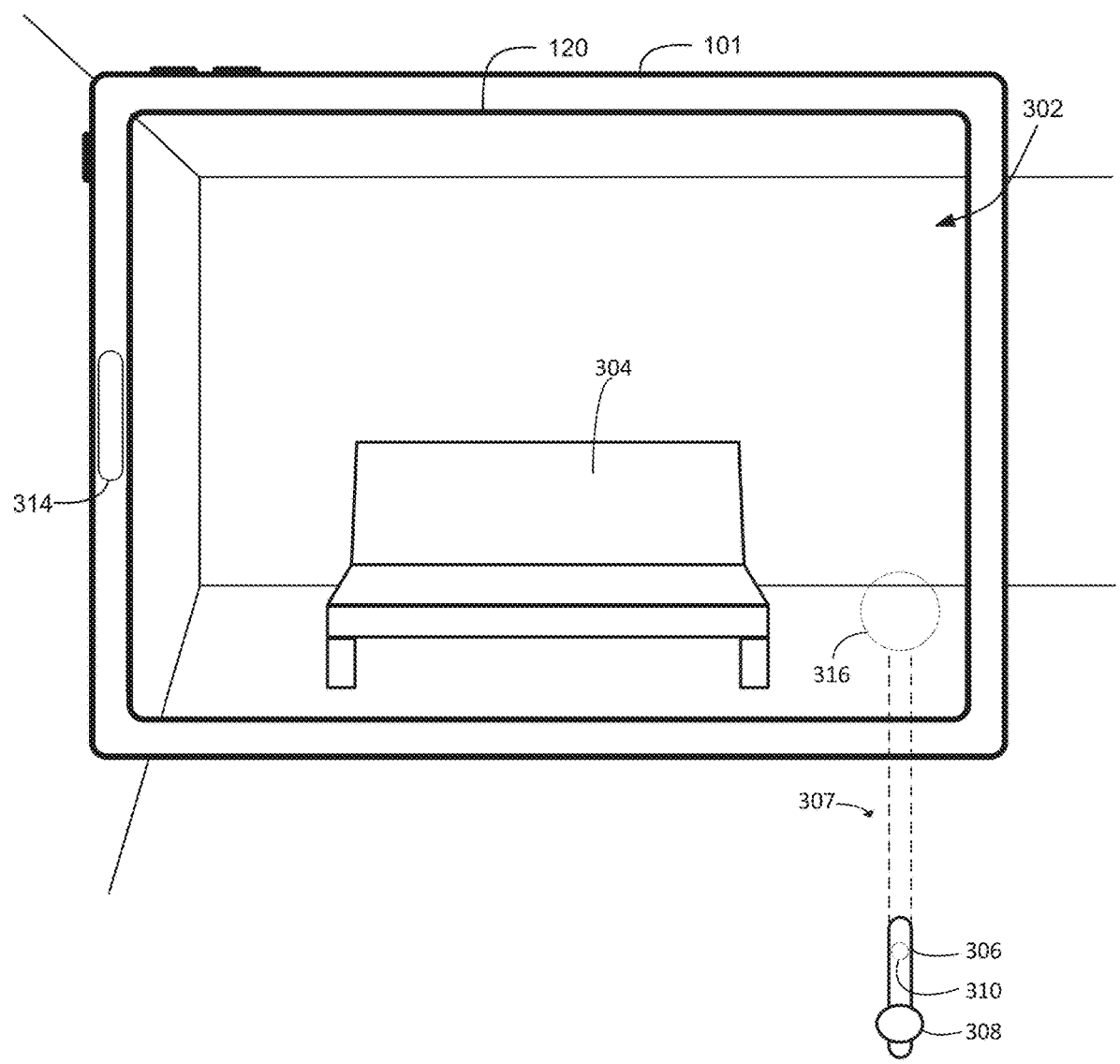

As shown in FIG. 3B, computer system 101 optionally displays object 316 corresponding to a back wall and the floor of the three-dimensional environment because a projection of device 306 intersects and/or is within a threshold distance of corresponding portions of the back wall and the floor. In some embodiments, the depth of object 316 depends on an intersection between the projection of device 306 and a closest physical and/or virtual object. For example, if a physical object was optionally placed between the back wall and device 306 such that the projection of device 306 intersected the physical object, computer system 101 would optionally display object 316 at a depth corresponding to the depth of the physical object intersecting and/or within a threshold distance of intersecting with the projection of device 306 (e.g., in the pointing direction), rather than at the depth of the back wall. In some embodiments, the depth of object 316 is a fixed (e.g., predetermined) distance relative to a portion of device 306 (e.g., the tip) at least when object 316 is initially displayed. In some embodiments, the depth of object 316 remains fixed relative to the portion of device 306. Thus, in such embodiments, the visual indication optionally provides feedback concerning the orientation (e.g., pointing direction) of an input object relative to object(s) within the three-dimensional environment. It is understood that in some embodiments, description of "depth" of object 316 relative to the user's viewpoint corresponds to a displaying object 316 at a simulated position within the three-dimensional environment having a simulated depth, similar to placing a physical object at a position within the three-dimensional environment at a physical position corresponding to the simulated position.

In some embodiments, the visual indication represented by object 316 provides an indication of an area of focus of tracing operations, and/or provides feedback about potential tracing targets such as edges, contours, and/or surfaces of objects within the three-dimensional environment. In some embodiments, the visual indication is a representation of a depth evaluation region. The depth evaluation region optionally indicates that computer system 101 will and/or is collecting physical and/or simulated spatial data to determine depth of one or more objects within the environment that are enclosed by object 316. For example, object 316, optionally corresponds to a region (e.g., a depth evaluation region) of the physical environment that computer system 101 analyzes to identify and/or detect potential tracing targets (e.g., edges, contours, and/or surfaces). In some embodiments, computer system 101 performs depth evaluation for a larger region of the three-dimensional environment than the region enclosed by object 316, and the region enclosed by object 316 is evaluated with a relatively higher resolution or higher fidelity relative to regions of the environment outside of the region defined by object 316. In some embodiments, object 316 is displayed in response to an event (e.g., an initiation input), such as contact 310 on device 306.

In some embodiments, computer system 101 updates a position of object 316 in accordance with movement of an input object. For example, in response to detecting an orientation of device 306 (e.g., an input object) change from a first orientation to a second orientation, computer system 101 moves object 316 from a first location corresponding to the first orientation to a second location corresponding to the second, modified orientation of device 306. In response to detecting the orientation of device 306 maintained at the first orientation, the computer system maintains display of object 316 at the first location. As described previously, it is understood that the first and/or second location correspond to three-dimensional positions within the three-dimensional environment, including a depth, a vertical position, and/or a horizontal position relative to the computer system 101 and/or device 306 based on a set of axes established relative to a viewpoint of a user of the computer system. In some embodiments, the viewpoint of the user of the computer system corresponds to what an individual using the computer system sees (e.g., what someone wearing a head-worn wearable device sees through a passive lens, a projected display, and/or an active display and/or what someone operating a mobile computing device sees via an active display such as a touch-sensitive display). It is understood that a "viewpoint of the user of the computer system" is merely one embodiment, and that the operations including detecting changes in position of an input object, displaying virtual objects and representations to facilitate tracing of an input object, and detecting manipulation of virtual ink representative of tracing operations are optionally performed relative to a viewpoint of circuitry included in and/or in communication with the computer system, such as imaging circuitry (e.g., one or more cameras) included and/or in communication with the computer system, and/or display circuitry included and/or in communication with the computer system.

In some embodiments, object 316 is displayed with a two-dimensional or three-dimensional appearance. For example, as shown, object 316 corresponds to portions of the physical environment having different respective depths relative to computer system 101 (e.g., through object 316 multiple objects may be visible including a first object at a first depth and a second object at a second depth different from the first depth), and object 316 is displayed with an apparent two-dimensional appearance, such that a plane of the two-dimensional shape is parallel to a plane of display generation component 120. In some embodiments, computer system 101 displays object 316 with a three-dimensional appearance, similar to a curved lens, a sphere, and/or a geometric shape having a uniform or nearly uniform depth relative to the current viewpoint of the user.

In FIG. 3B, rays 307 optionally correspond to a detected orientation (e.g., pointing direction) of one or more input objects relative to the three-dimensional environment 302, computer system 101, and/or one or more objects (e.g., physical and/or virtual objects). For example, rays 307 as shown in FIG. 3B correspond to projections extending from a portion of input device 306 (e.g., an input object), such as a tip of a housing of device 306 and/or a projection of device 306 parallel to and intersecting with a portion of the housing of device 306 (e.g., an outer surface of the housing). As described with reference to FIG. 2, device 306 optionally includes one or more sensors (e.g., optical, Micro-Electro-Mechanical Systems (MEMS), capacitive, electromagnetic, acoustic, and/or other suitable sensor(s)) configured to detect an orientation of an input object, communicate the orientation and/or position of the input object, and display representations such as rays 307 of the orientation. Computer system 101 optionally uses such an orientation to display rays 307, thus visually indicating the orientation of the input object with respect to computer system 101 and/or three-dimensional environment 302. In some embodiments, the computer system determines a greater or fewer number of rays than as shown, for example, a single ray emanating from a center of the tip of device 306 extending parallel to a cylindrical housing of device 306. In some embodiments, rays 307 are determined but not displayed by computer system 101.

Figure 3C:
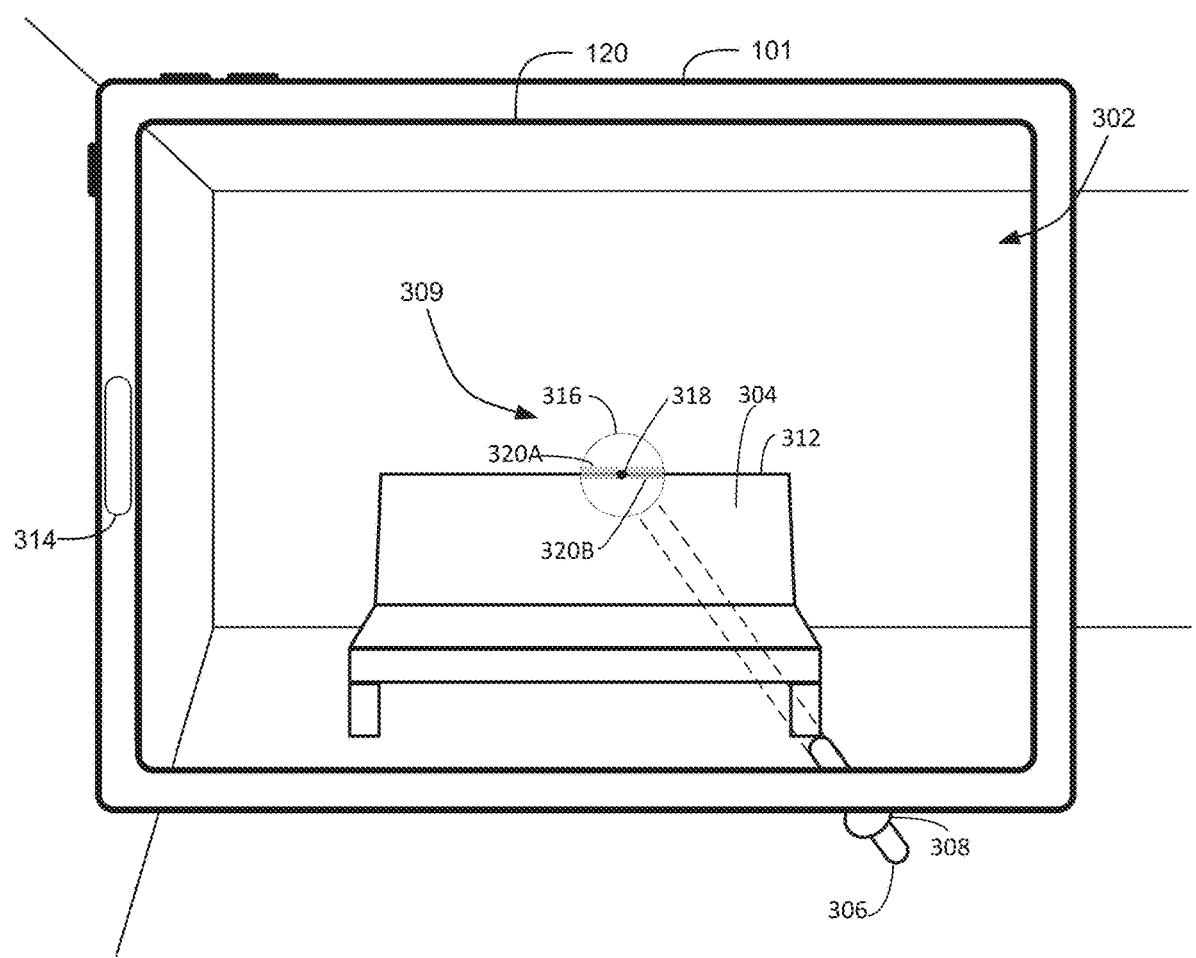

From FIG. 3B to FIG. 3C, computer system 101 detects movement of input objects including device 306 and/or object 308 pointing toward sofa 304 while tracing is enabled. As described previously, when a tracing mode is enabled, object 316 is optionally displayed, and one or more edges, surfaces, and/or contours of objects within the three-dimensional environment are optionally evaluated for potential candidates of tracing operations. In accordance with a determination that one or more tracing candidates correspond to the pointing direction of device 306 and/or object 308, computer system 101 optionally visually distinguishes such tracing candidates. Additionally or alternatively, when a tracing candidate edge, contour, and/or surface is identified, the computer system optionally visually indicates where potential tracing will begin and/or will continue.

In some embodiments, computer system 101 visually distinguishes at least a portion of the potential edge that the user is able to trace-referred to herein as a "candidate edge." For example, candidate edge 320A corresponds to a first portion of edge 312 and candidate 320B corresponds to a second portion of edge 312. Although illustrated as separate portions of a visual representation of the candidate edge bound by object 316, in some embodiments, computer system 101 displays a greater or fewer number of portions of a candidate edge. In some embodiments, computer system 101 visually distinguishes the candidate edges relative to the three-dimensional environment. For example, a respective candidate edge is optionally visually emphasized with a highlighting effect, a brightness, a color, a saturation, a simulated lighting effect, a border, and/or a pattern fill to distinguish from other portions of the three-dimensional environment, including but not limited to such portions bound by object 316. For example, object 316 is optionally displayed with a color fill including a first level of opacity (e.g., gray and mostly transparent) and candidate edges 320A and 320B are optionally displayed with a second color fill and a second, different level of opacity (e.g., blue and mostly opaque).

In some embodiments, in response to an event (e.g., initiation input) described previously, computer system 101 displays an indication of a current or potential tracing position. In some embodiments, the indication of the current tracing position is displayed while a tracing mode is enabled (e.g., was previously enabled in response to the event) and while an input object is oriented toward a physical and/or virtual object including a candidate edge. For example, in FIG. 3C, computer system 101 optionally detects device 306 is oriented toward a portion of edge 312 (e.g., a projection of a tip of device 306 is within a threshold distance of edge 312), and in response, computer system 101 optionally displays cursor 318 at the corresponding portion of edge 312 (e.g., corresponding to the projection) to indicate a current position of device 306 (e.g., the tip of device 306) relative to sofa 304. In some embodiments, cursor 318 visually indicates a position from which a currently displayed representation of object tracing initiates or will continue, described in further detail with reference to FIG. 3D. In some embodiments, cursor 318 is displayed with a visual appearance (e.g., radius, color, brightness, saturation, and/or opacity) to distinguish the cursor 318 from representations of a candidate edge, physical objects, and/or the three-dimensional environment of the user.

In some embodiments, when device 306 is oriented to correspond to a portion of edge 312, computer system 101 displays cursor 318 at a position corresponding to the portion of edge 312, and when device 306 is not oriented to correspond to edge 312, computer system 101 forgoes display of cursor 318. For example, computer system 101 optionally determines one or more projections of a respective portion of device 306 intersects with the portion of edge 312. Computer system 101 optionally determines one or more rays extending from computer system 101 coincides with the portion of edge 312 (e.g., rays 307 corresponding to where cursor 318 is currently displayed as shown in FIG. 3C). In some embodiments, computer system 101 determines one or more rays extending from computer system 101 do not coincide (e.g., intersect) with the portion of edge 312, however, are within a threshold distance of the portion of edge 312, and displays cursor 318 at the position corresponding to the portion of the edge (e.g., despite the one or more rays not intersecting the portion of edge 312). For example, computer system 101 optionally determines that one or more points along a first ray extending from a respective portion of device 306 are within a threshold distance of edge 312, and in response, optionally display cursor 318 at a position corresponding to the position of the ray (e.g., from an axis extending along the body of device 306 and extending through an axial center of a housing of device 306, tangent to the housing of device 306, and/or between the center and the housing of device 306), as discussed further at least with reference to FIG. 3D. In some embodiments, computer system 101 uses depth information to detect edge 312, and uses such information to display candidate edges 320A and 320B and cursor 318.

In some embodiments, computer system 101 detects and/or receives depth information, and uses such depth information to identify one or more candidate contours, surfaces, and/or edges of objects within three-dimensional environment 302. For example, as described with reference to FIG. 3B, computer system 101 optionally displays object 316 optionally corresponding to a region of evaluation. As shown, computer system 101 optionally detects depth information corresponding to sofa 304 and wall 309 as indicated by the evaluation region bounded by object 316. In some embodiments, depth information optionally includes quantitative and/or qualitative measures of depth of portions of the three-dimensional environment 302 including objects in the environment relative to computer system 101. For example, computer system 101 optionally collects spatial data including but not limited to optical data such as Light Detection and Ranging (LIDAR) and/or image data from one or more cameras included in and/or in communication with computer system 101, and optionally applies one or more operations to process such spatial and/or image data to identify one or more contours, surfaces, and/or edges as candidates for tracing operations using the one or more sensors included in device 220 and/or device 230 shown in FIG. 2.

In some embodiments, the computer system 101 optionally applies one or more filters to depth information corresponding to objects in the three-dimensional environment to detect one or more portions of a candidate edge. For example, a first filter optionally is optionally configured to detect differences in depth that indicate discontinuities and/or transitions in depth between portions of the three-dimensional environment 302, such as a relatively sharp transition in depth between sofa 304 and wall 309. For example, a seat back of sofa 304 including edge 312 optionally corresponds to a first depth and/or range of depths (e.g., at 5 m and/or within a threshold depth of 5 m relative to a viewpoint of a user of the computer system), and wall 309 behind the sofa 304 optionally corresponds to a second, different depth and/or range of depths (e.g., at 15 m and/or within a threshold depth of 15 m relative to the viewpoint of the user). Computer system 101 optionally detects that a difference in depth between edge 312 and wall 309 exceeds a threshold difference in depth, and optionally displays candidate edges 320A and 320B at respective positions where the difference in depth exceeds the threshold difference, thereby visually indicating one or more portions of the candidate edge. A candidate edge optionally includes a series of positions within the three-dimensional environment relative to the user's viewpoint and/or a series of positions within the three-dimensional environment that are determined to correspond to an edge of an object (e.g., edge 312).

In some embodiments, a computer system determines a candidate edge using one or more additional or alternative filters. For example, computer system 101 optionally detects one or more images corresponding to a current viewpoint of the user, and optionally identifies one or more visible lines (e.g., portions of edges) based on the output of one or more filters (e.g., Laplacian, Canny, Sobel, and/or Scharr filters) and/or using suitable machine learning techniques applied to the one or more images. For example, the top edge 312 of sofa 304 optionally is a continuous, or nearly continuous line from the perspective of the current viewpoint of the user, and based on results using one or more filtered applied to image data corresponding to the top edge 312, computer system 101 optionally indicates the presence of a horizontal or nearly horizontal line corresponding to edge 312. Accordingly, computer system 101 optionally visually distinguishes (and/or determines, but does not visually distinguish) candidate edge 320A and/or candidate edge 320B as candidate edges based on the results of one or more filters. In some embodiments, the computer system 101 determines candidate edges using the depth thresholding operations in addition to the line detection operations described above.

It is understood that the embodiments described herein with reference to tracing and identification of an "edge" and/or "edges" of a physical object optionally apply to contours and/or surfaces of the physical object, optionally apply to other physical objects than those illustrated herein, and/or optionally apply to virtual objects. For example, computer system 101 optionally detects a contour and/or a surface of a physical object based on detected gradual changes in depth (e.g., of a surface), and optionally traces a face of the contour based on movement of an input object directed to the face of the contour. As an additional example, computer system 101 optionally detects a sharp change in depth (e.g., indicative of an edge of an object), and visually distinguishes the contour and/or surface as a candidate contour and/or surface and/or traces the contour and/or surface similar to as described with reference to visually distinguishing and/or tracing an edge of a physical object. For example, a candidate surface is optionally displayed with a color or pattern fill to indicate its candidacy for tracing.

In some embodiments, computer system 101 detects one or more inputs corresponding to a request to display virtual ink tracing the previously described candidates edge(s). As described previously, computer system 101 optionally performs one or more indirect tracing methods and smooths the path of the virtual ink using a simulated magnetic tracing effect. For example, when the computer system optionally detects movement of one or more input objects while the one or more input objects remain within a threshold distance and/or generally follows along dimension(s) of a candidate edge during a tracing operation, the computer system optionally displays a visual representation of tracing (e.g., virtual ink) based on the movement that follows the candidate edge, minimizing or suppressing the effects of movement(s) of the input object that would otherwise cause a jagged and/or uneven appearance of the visual representations of tracing that do not follow the contours of the edge. Embodiments illustrating such features are shown in FIGS. 3D-3F, and described further below.

Figure 3D:
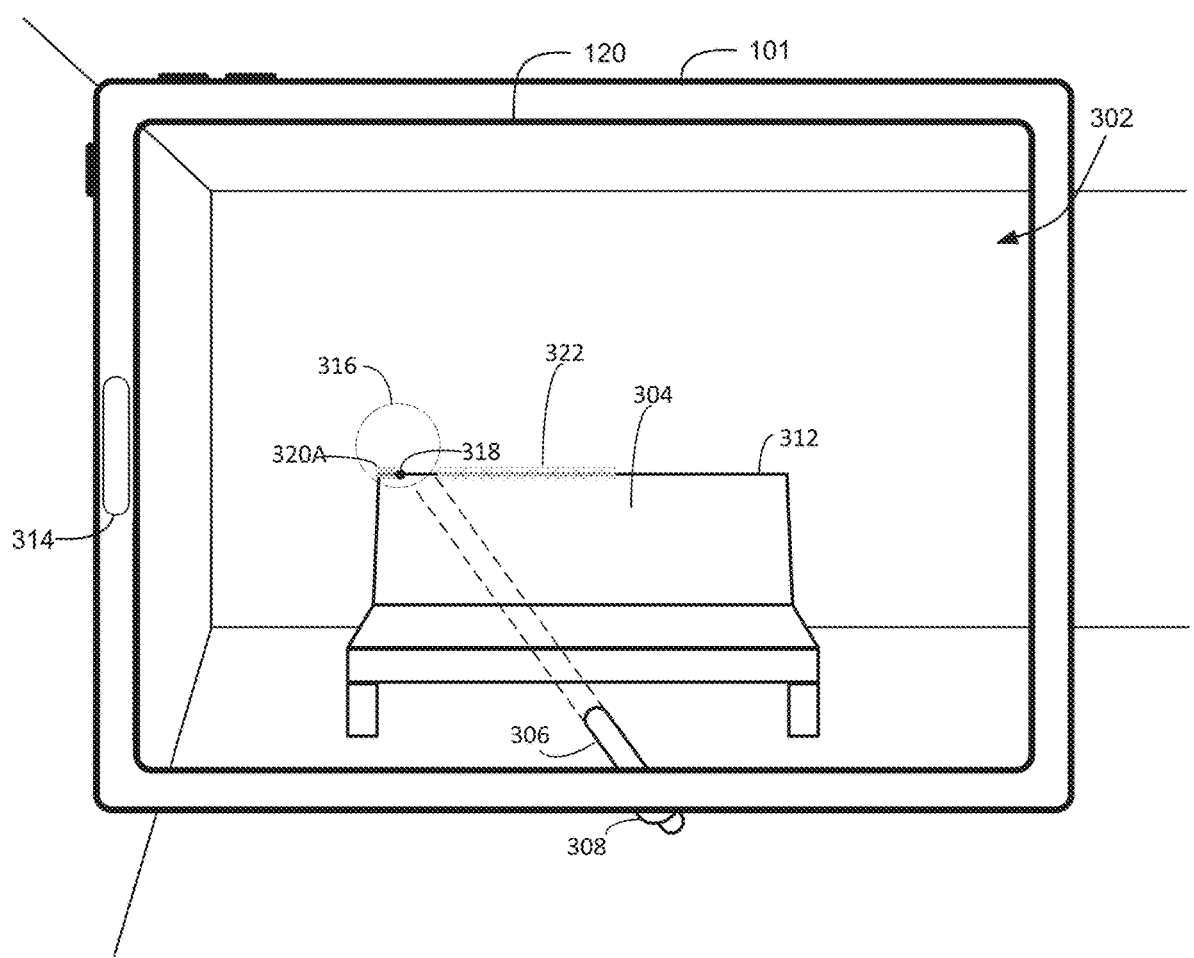
Figure 3E:
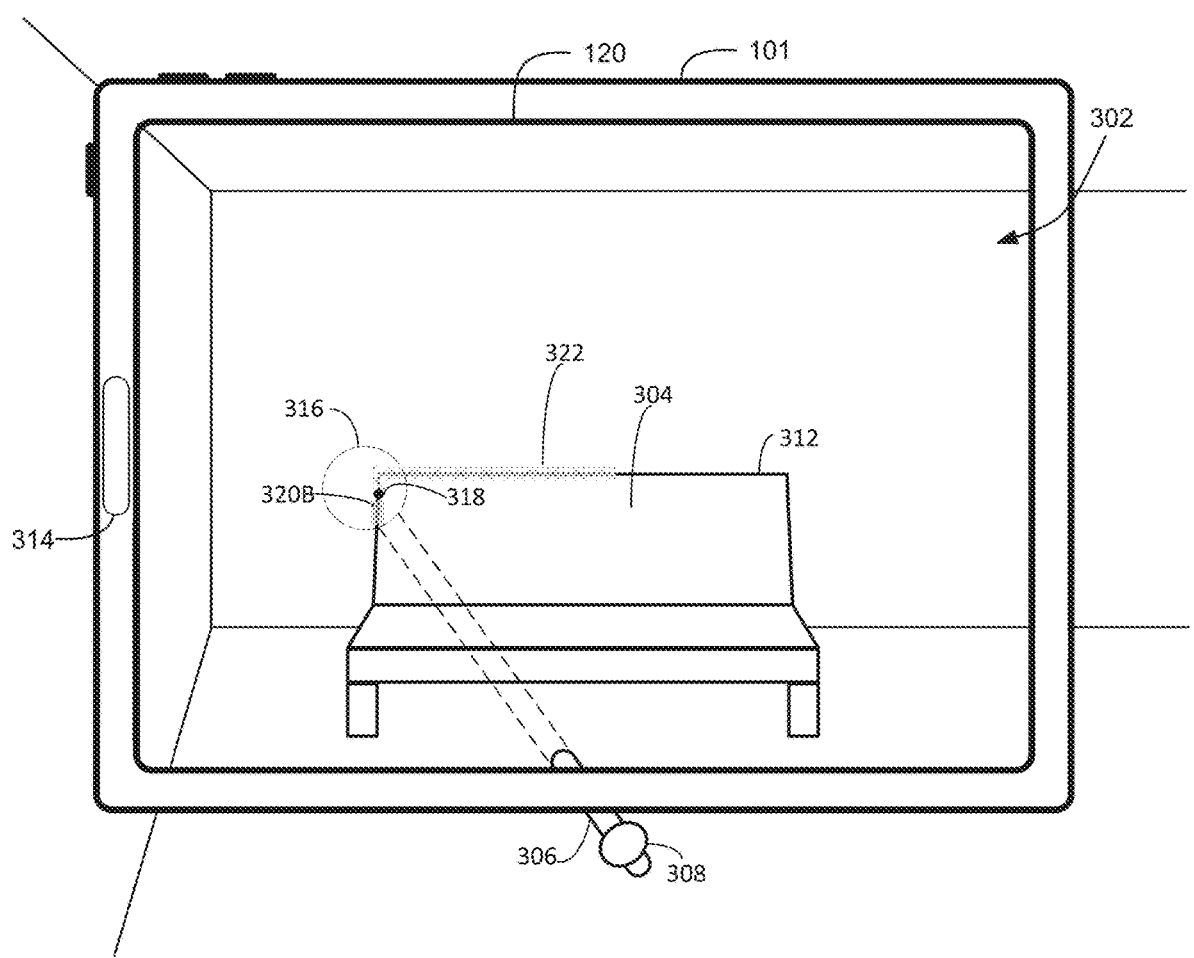
Figure 3F:
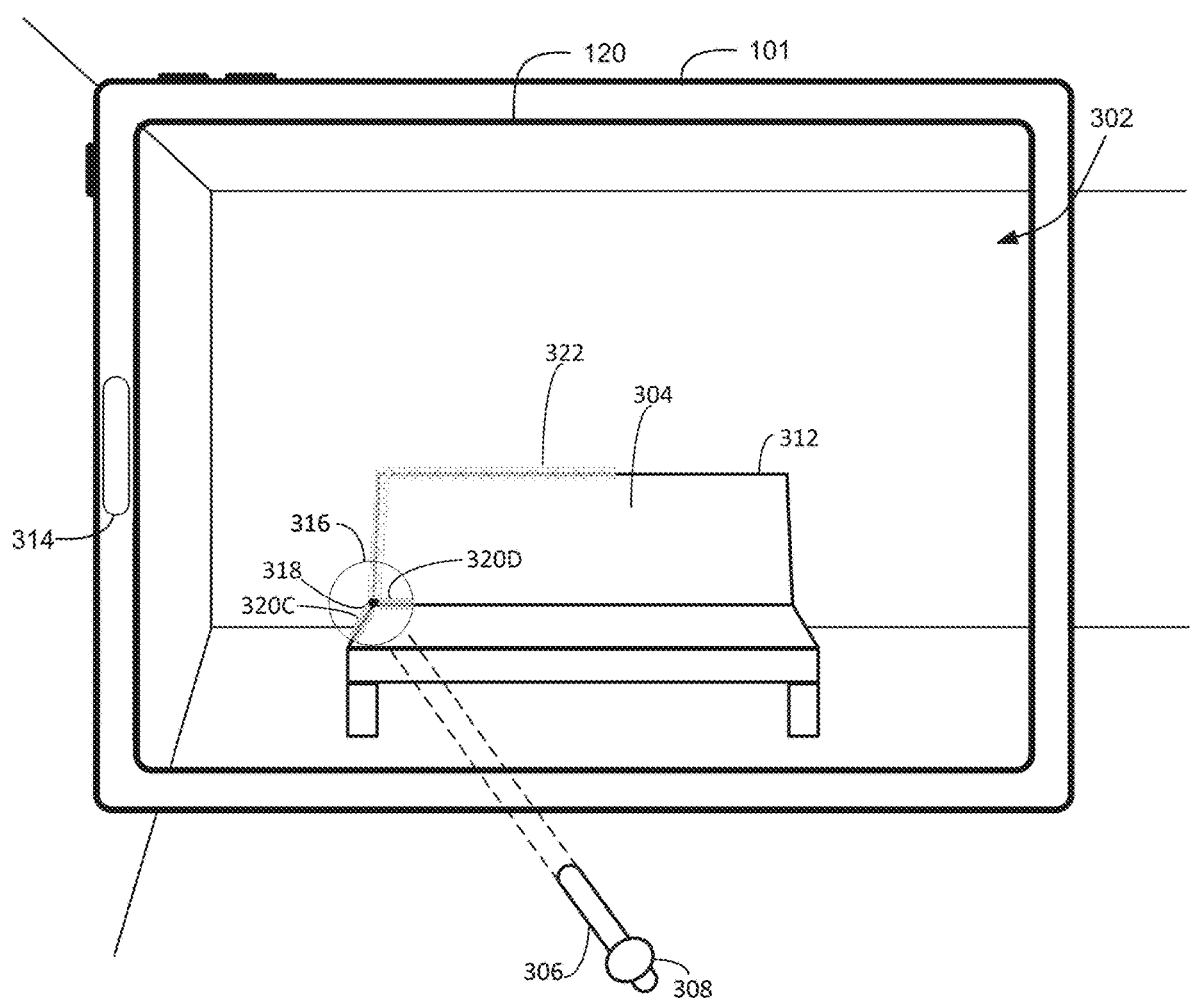

From FIG. 3C to FIG. 3D, while the tracing operation is enabled, computer system 101 optionally displays a visual representation of tracing analogous to marks made by a simulated drawing implement tracing along a target object, such as virtual inking indicated by highlight 322 made by a simulated marker, highlighter, pencil, and/or pen based on movement of device 306 and/or object 308. Although the visual representations of tracing are described with respect to a simulated drawing implement (e.g., highlighting made by a highlighter, inking made by a marker or pen), it is understood that such descriptions are merely exemplary, and that in some embodiments the visual representations of tracing assume a visual appearance that differs from a simulated drawing implement. For example, a three-dimensional object like a virtual cylinder or line segment extending along a path of the tracing operation.

From FIG. 3C to FIG. 3D, the computer system detects leftward movement of device 306 corresponding to the edge 312 of sofa 304 while a tracing mode is enabled, and in response displays highlight 322 based on the movement. During such a movement, computer system 101 optionally detects that a projection of device 306 optionally remains within a threshold distance of edge 312, and accordingly displays highlight 322 along portions of edge 312 corresponding to the leftward movement.

In some embodiments, due to magnetic tracing operations, computer system 101 suppresses display of virtual inking corresponding to erroneous and/or unwanted movement that would otherwise cause a jagged appearance of highlight 322. For example, using depth information, computer system 101 optionally determines the presence of edge 312 relative to the three-dimensional environment 302. In response to detecting the leftward movement of device 306 while device 306 is oriented toward edge 312, computer system 101 optionally determines that the user has provided input including a request to trace edge 312. Such movement of device 306, however, optionally include positional deviations of a projection extending from device 306 that deviate away from the dimensions and/or curvature of edge 312. Additionally or alternatively, movement of device 306 erroneously moving rightward requesting tracing of portions of edge 312 already displayed with a portion of highlight 322 are optionally redundant. To suppress the effect of the deviations and/or erroneous movements contributing to a jagged appearance of highlight 322, computer system 101 optionally forgoes display of virtual ink based on the unwanted deviations and/or erroneous movements. For example, from FIG. 3C to FIG. 3D, computer system 101 optionally determines that movement of device 306 generally remains within the threshold distance of edge 312, and does not display virtual ink based on movements away from edge 312 (e.g., upwards or downwards, away from the horizontally extending edge 312). Thus, computer system 101 optionally presents a smooth visual representation of tracing along edge 312, similar to as if a simulated writing implement were magnetically attracted to and disposed ink along edge 312, rather than disposing virtual ink perfectly tracking every movement of the projection of device 306 relative to edge 312.

In some embodiments, computer system 101 updates display of cursor 318 to reflect changes in position of device 306. For example, in response to the leftward movement of device 306 from FIG. 3C to FIG. 3D, computer system 101 optionally moves cursor 318 to an updated position that is leftward, corresponding to an updated position of device 306 projected onto and/or near to edge 312. In some embodiments, computer system 101 displays cursor 318 at a position along edge 312 in accordance with a determination that a projection of device is 306 is within a threshold distance—rather than perfectly intersecting—with edge 312.

In some embodiments, computer system 101 optionally updates a position of cursor 318 in response to movement of device 306, similar to as to described with reference to the display of virtual inking and highlight 322. For example, from FIG. 3C to FIG. 3D, device 306 moves leftward and upward relative to edge 312. Based on the leftward movement, computer system 101 optionally moves cursor 318 leftward along edge 312. Based on the upward movement of device 306, computer system 101 optionally does not change the position of cursor 318. In response to movement of device 306, cursor 318 optionally is displayed sliding along edge 312 based on movement along the dimensions of edge 312. For example, as shown in FIG. 3D, object 316 is moved vertically away from edge 312 based on the upward of device 306 relative to from its position as shown in FIG. 3C. In response to the vertical movement however, cursor 318 is displayed at a same vertical position relative to as shown in FIG. 3C. Thus, in some embodiments, the computer system displays a visual indication corresponding to a current position of one or more input objects relative to a candidate surface and/or edge of a target object if one or more criteria are satisfied, including a criterion satisfied when the input object is within a threshold distance (e.g., corresponds to) the surface and/or the edge. As described in further detail below, the computer system optionally displays a visual representation of tracing such as the virtual ink that follows an edge, contour, and/or surface of a target object of a tracing operation, similar to as described with the display of the cursor along an edge of a target object.

In some embodiments, the computer system detects an input including a movement of the input object. For example, while the tracing operation is enabled, computer system 101 optionally detects leftward movement, as illustrated by the movement of device 306 and object 308 from as shown in FIG. 3C to as shown in FIG. 3D. In response to the input including the movement, computer system 101 optionally displays one or more representations of tracing based on the input (e.g., virtual inking), including displaying virtual ink in a direction and with a size based on a direction and magnitude of movement of the corresponding input object. For example, computer system 101 optionally detects one or more criteria are satisfied, including a criterion that is satisfied when the movement of the input object includes a first movement corresponding to edge 312. Such a correspondence between the movement of the input object and the first movement optionally includes a determination that the input object and/or a projection of the input object remains within a threshold distance of edge 312. For example, computer system 101 optionally detects that the input object and/or one or more rays extending from the input object are oriented toward sofa 304 and/or are within a threshold distance (0.1, 0.25, 0.5, 1, 2.5, 5, 10, 25, 50, or 100 cm) of edge 312 during the leftward movement of device 306 and/or object 308, and/or are within an apparent threshold distance (e.g., if the target tracing object is a virtual object, the computer system optionally detects that the input object and/or a projection of the input object would be within the threshold distance of a physical object corresponding to the virtual object, placed at a position corresponding to the virtual object). Accordingly, computer system 101 displays highlight 322 based on the leftward movement meeting the one or more criteria. Thus, the illustrated tracing operation follows edge 312 as suggested by candidate edge 320A in FIG. 3C.

In some embodiments, the visual representation of tracing is further based on one or more detected dimensions of the object edge detected using depth information. For example, highlight 322 neatly follows the edge 312 in accordance with an amount of movement of the input object(s) (e.g., device 306 and/or object 308) generally extending along edge 312 due to the simulated magnetic tracing effect described previously. The amount of movement of the input object(s) used as a basis for displaying the representation of tracing is optionally based on one or more components of movement of the input object. For example, computer system optionally detects that edge 312 extends along a first axis that is parallel, or nearly parallel to the physical floor of three-dimensional environment 302, and optionally detects movement of an input object, including a first component of movement in a first amount parallel to the first axis (e.g., movement of the input object toward the leftmost wall of three-dimensional environment 302), and further including a second component of movement in a second amount perpendicular to the first axis (e.g., movement of the input object toward the ceiling of three-dimensional environment 302), and optionally displays the visual representation of tracing based on the first component of the movement, but not the component of movement. Thus, computer system 101 optionally forgoes consideration of the second, vertical movement of the input object in displaying highlight 322, and traces edge 312 predominantly using the first component of movement. Such a tracing operation is beneficial at least because the tracing operation can thereby smooth the visual representation of tracing to follow the dimension(s) of an edge, contour and/or surface of a virtual and/or physical object, and can forego display an uneven or jagged appearance of visual representations of movement of the input object that deviate from the dominant dimension(s) of the edge (e.g., movement perpendicular to the dominant dimension of edge 312).

In some embodiments, the computer system traces one or more edges of a target object of a tracing operation imperfectly aligned with the dimensions of its physical environment. For example, although not illustrated, edge 312 is optionally sloped such that a left corner of the edge 312 appears higher than a right corner of edge 312 relative to computer system 101. In response to detecting tracing input(s) along the slope of edge 312, computer system 101 optionally displays representation(s) of tracing based on components of movement of the tracing input(s) that extend parallel to the slope, and forgoes display of representations of tracing input(s) that are perpendicular to the slope. In some embodiments, the computer system displays a representation of tracing based on a first component of movement along an edge that is non-linear (e.g., jagged and/or curved) and forgoes display of the representation of tracing based on a second, perpendicular component of movement. For example, the computer system optionally detects movement of an input object including leftward and upward along a curved edge bowing upwards, and optionally displays the representation of tracing based on the leftward movement, optionally forgoing consideration and/or display of a portion of the representation of tracing based on the upward movement.

FIGS. 3D-3G illustrate embodiments of magnetic tracing along edges and/or corners of an object, and embodiments of visually indicating multiple candidate edges simultaneously. For example, the figures illustrate leftward movement, downward movement, and rightward movement tracing along edges of the object, and the highly accurate visual representation of tracing (e.g., virtual inking) that follows the edges of the object.

From FIG. 3D to FIG. 3E, computer system 101 detects a corner of candidate edge 312, and further detects movement of an input object including device 306 while a tracing operation is enabled tracing edge 312 and the corner. In response to the movement (e.g., leftward and/or downward) relative to sofa 304, highlight 322 extends to trace edge 312 including the corner. In such an example, as device 306 is moved along the corner of edge 312, the computer system optionally detects that a dominant axis of the candidate edge 320B has changed relative to the dominant axis of the candidate edge 320A as shown in FIG. 3C. Computer system 101 therefore optionally displays a vertically, or nearly vertically oriented representation of tracing in response to movement following edge 312 along the vertical, or nearly vertical portion of edge 312, and optionally forgoes display of jagged portions of virtual ink in response to horizontal movement while tracing the vertical, or nearly vertical portion of edge 312. It is understood that display of virtual ink based on other movements of device 306 generally away from the dimensions of the corner included in edge 312 are additionally or alternatively forgone when such movements are not strictly horizontal or vertical relative to edge 312. In some embodiments, the computer system 101 uses depth information to identify continuity along the corner of edge 312 between the predominantly horizontal portion of edge 312 and the predominantly vertical portion of edge 312.

From FIG. 3E to FIG. 3F, computer system 101 detects movement of one or more input objects including device 306 and/or object 308 tracing the left edge of a seat back of sofa 304, and in response, extends the display of highlight 322 to reflect the tracing operation. In some embodiments, the computer system detects and displays visual indications of a plurality of candidate edges. For example, in FIG. 3F, computer system 101 optionally detects a region of evaluation indicated by object 316 has captured divergent candidate edges. Candidate edge 320D, for example, extends horizontally along a base of a seat back of sofa 304. Candidate edge 320E, on the other hand, extends along an edge of a seat of sofa 304 at least partially toward a current viewpoint of computer system 101.

Figure 3G:
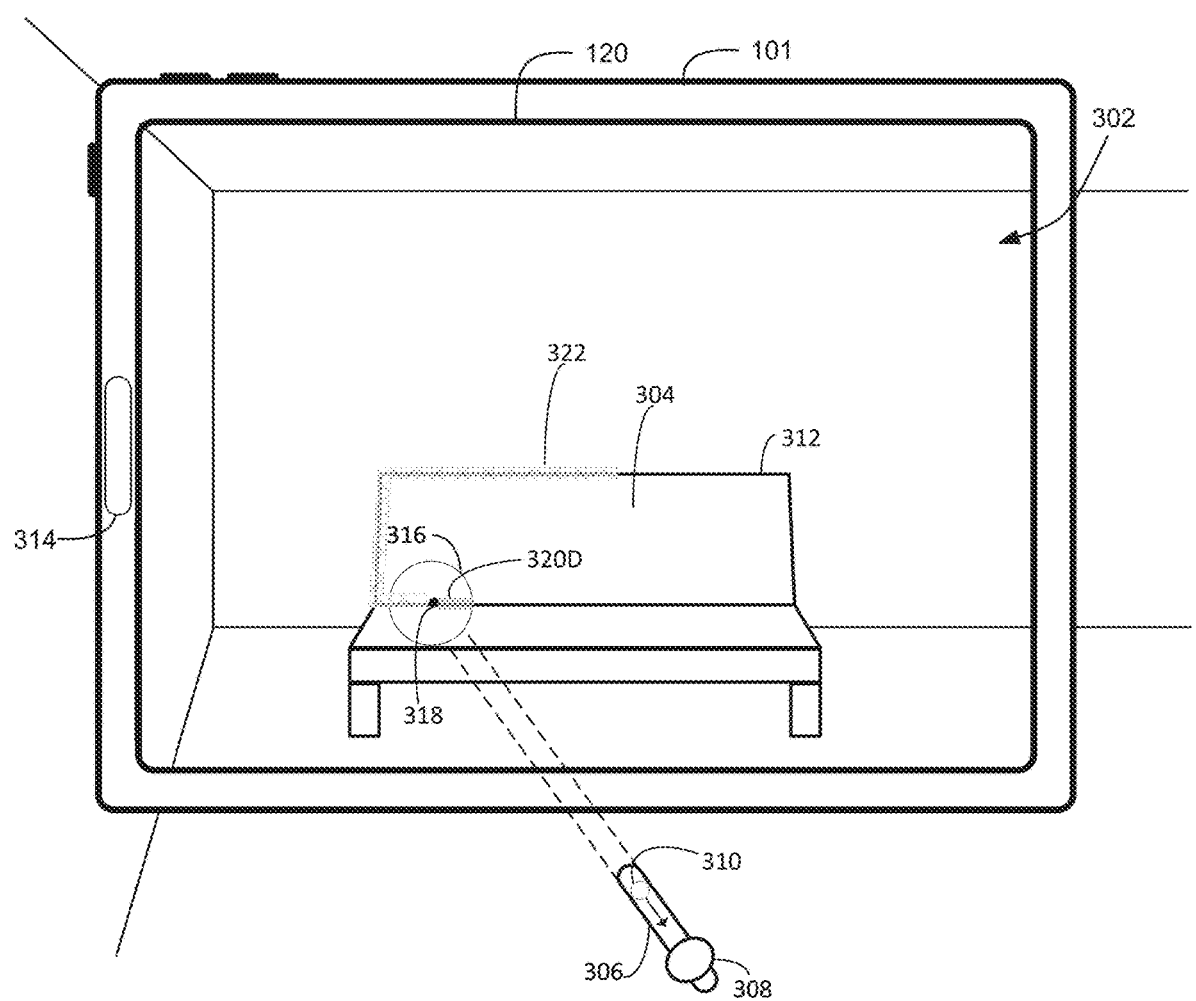

As shown, computer system 101 detects the position of device 306 and accordingly displays cursor 318 at a position from which a user of the computer system can trace either candidate edge, depending on subsequent input directed to device 306 (e.g., movement). In FIG. 3G, the computer system detects movement corresponding to candidate edge 320D, and in response, extends the representation of tracing in accordance with the movement. In response to detecting movement of device 306 corresponding to candidate edge 320D, computer system 101 optionally forgoes display of virtual ink corresponding to candidate edge 320E.

Figure 3H:
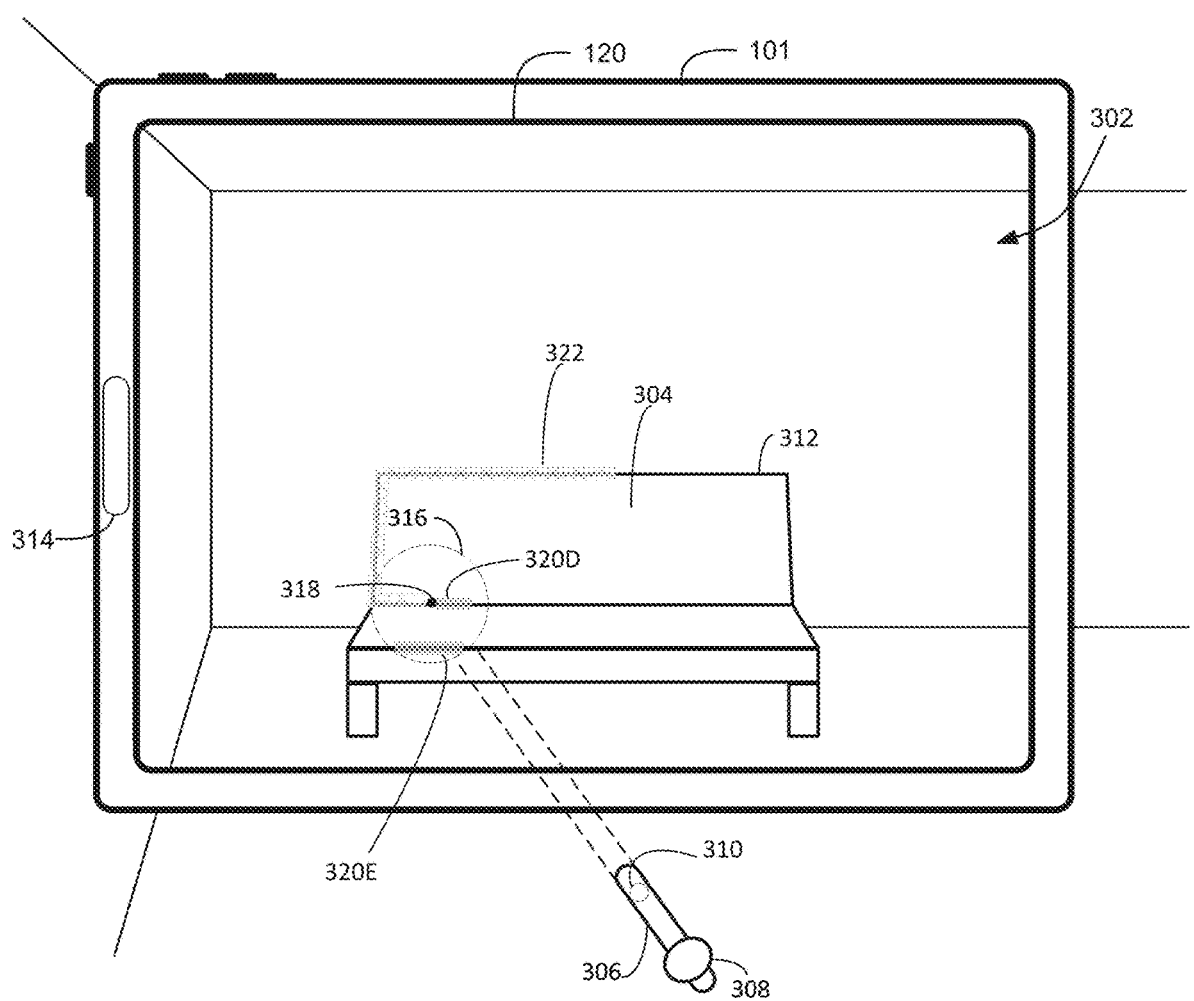

In some embodiments, the computer system detects input to modify the region of depth evaluation and a corresponding visual representation of the region, and in response to the input, modifies the region of depth evaluation. In FIG. 3H, the position of device 306 is maintained relative to FIG. 3G, and contact 310 and movement of contact 310 are detected on a housing of device 306, optionally corresponding to a request to modify a size of a region of evaluation indicated by object 316. In response to the movement of contact 310, object 316 expands based on an amount of the movement. Additionally or alternatively, based on the expanded evaluation region, an additional candidate edge 320E is detected and visually distinguished by computer system 101. Thus, without detecting additional movement of device 306, computer system 101 optionally detects additional candidate edges due to the expanded depth evaluation region.

Figure 3I:
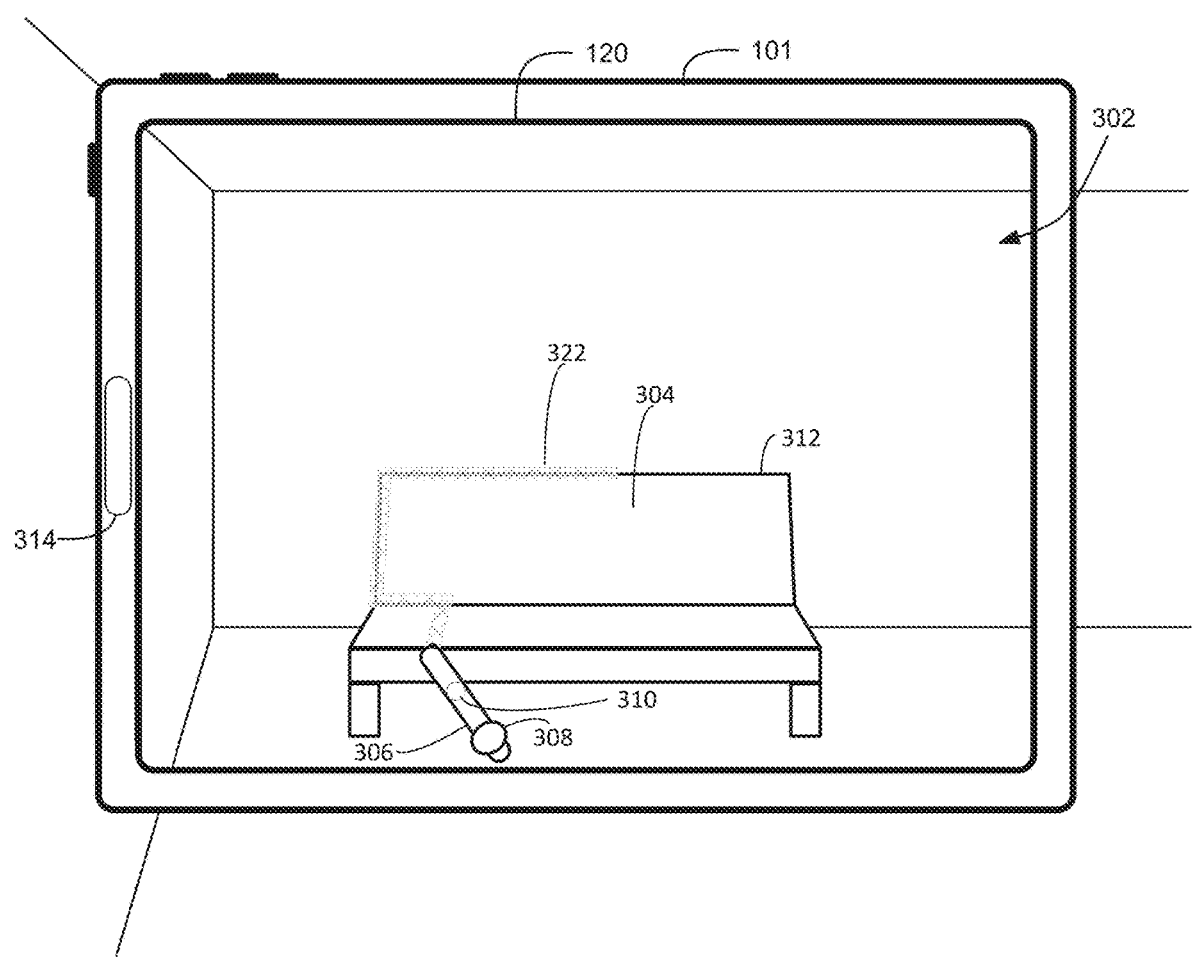
Figure 3J:
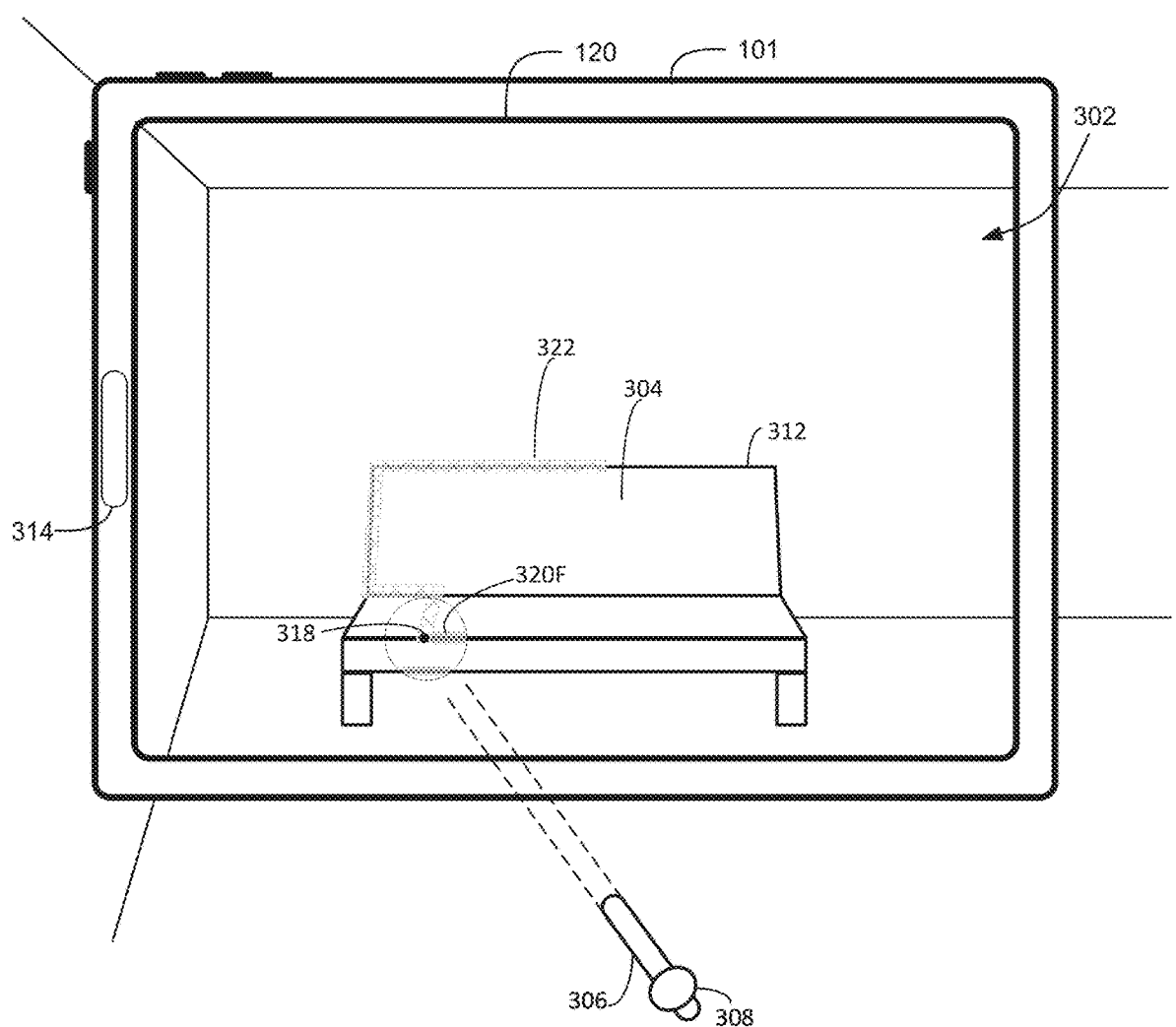
Figure 3K:
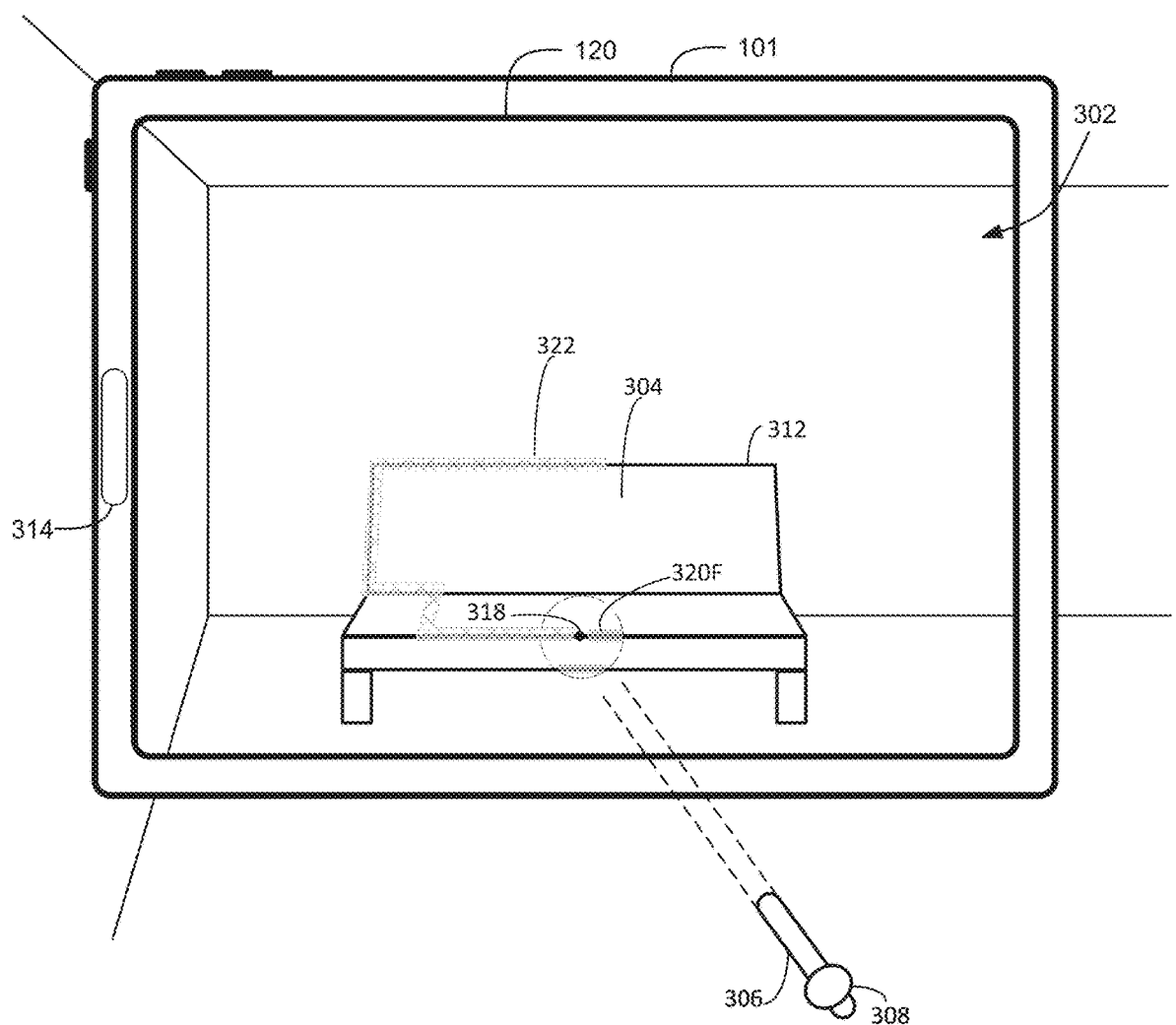
Figure 3L:
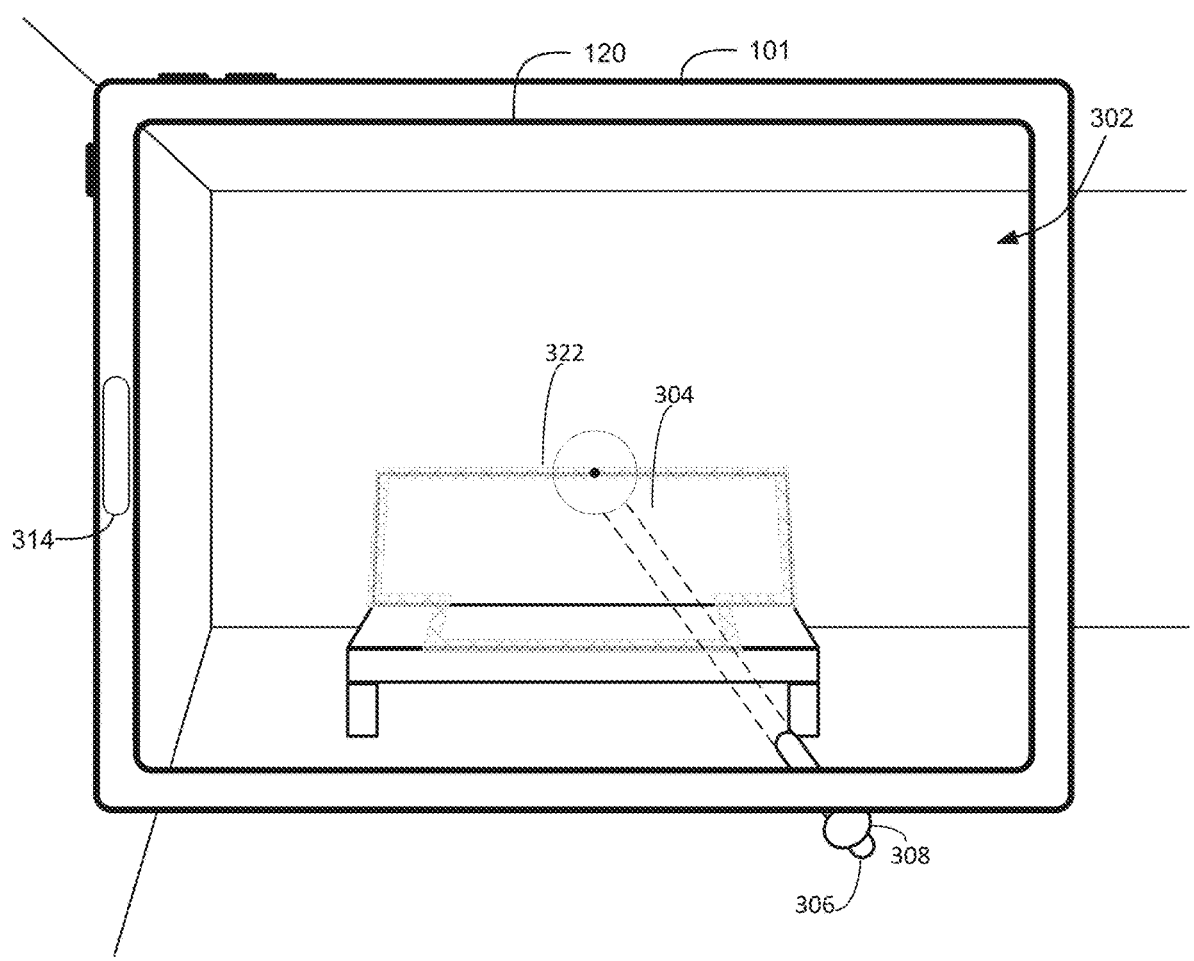

In some embodiments, the computer system detects an input associated with the input object satisfying one or more demagnetization criteria, and in response the input, ceases magnetic virtual inking along a candidate edge. For example, from FIG. 3H to FIG. 3I, in accordance with a determination that device 306 is moved greater than a threshold distance and/or greater than a threshold velocity away from edge 320D, computer system 101 ceases display of virtual ink in accordance with movement of device 306 and/or extends an ongoing highlight to another edge of a traced object. In response, the computer system extends highlight 322 toward another proximate candidate edge, such as edge 320E. As shown in FIG. 3J, in response to detecting such a input satisfying the one or more demagnetization criteria, computer system 101 extends highlight 322 toward proximate candidate edge 320E across different detected edges of sofa 304, and ceases magnetic virtual tracing along its previous candidate edge. From FIG. 3J to FIG. 3K, computer system 101 detects a series of inputs (e.g., movements) of device 306 expanding highlight 322 extending rightward, and in response extends highlight 322 along the candidate edge 320 shown in FIG. 3J (e.g., rather than along a previously magnetized candidate edge). From FIG. 3L to FIG. 3K, computer system 101 detects one or more inputs including movement of device 306 completing a closed-figure tracing of portions of highlight 322.

In some embodiments, highlight 322 is expanded, but is not a continuous or closed figure shape. In some embodiments, although not shown, computer system 101 detects a termination of the tracing operation (e.g., an actuation of a physical and/or virtual button, a voice command, and/or a contact on a touch-sensitive surface of a device in communication with the computer system). After detecting the termination, the computer system optionally detects a second initiation input, similar to the previously described initiation input, and re-initiates the tracing operation at a non-contiguous portion or edge of sofa 304 (e.g., tracing candidate edge 320E) in response to the second initiation input. In response to the re-initiation of tracing, computer system 101 optionally displays virtual ink (e.g., highlighting candidate edge 320E) that is optionally non-contiguous with highlight 322. In some embodiments, when re-initiating tracing, computer system 101 displays virtual ink at a new candidate edge that is different from a previously traced edge, and/or is different from a last-traced edge.

In some embodiments, in accordance with a determination that a plurality of visual representations of tracing intersect, the computer system visually and logically joins at least a portion of the intersecting visual representations. For example, highlight 322 is shown as a contiguous outline, indicating that the highlight described in FIG. 3C-FIG. 3D is optionally visually joined to the additional tracing performed from FIG. 3K-FIG. 3L. In some embodiments, the computer system additionally or alternatively joins the intersecting visual representation logically. For example, the joined representation of tracing is optionally manipulated (e.g., scaled, translated, and/or rotated) as a single virtual object, rather than piecemeal, as described further below.

In some embodiments, a plurality of visual representations of tracing are logically but not visually joined (e.g., portions of highlight 322 are non-contiguous and/or non-continuous), such that a group including the plurality of visual representations are modified together in response to the manipulation operations described with reference to FIGS. 3M-3P below.

In some embodiments, computer system 101 creates a group of virtual ink representations in response to manual input selecting the plurality of non-contiguous visual representations of tracing. In some embodiments, the non-contiguous group is created in accordance with a determination that the constituent visual representations of tracing were entered while a first instance of a tracing operation is enabled. For example, when the group optionally was displayed while a tracing mode was enabled a first time, excluding other visual representations of tracing displayed while the tracing mode was enabled a second time. In some embodiments, such a group is created when respective portions of visual representation of tracing are entered within a threshold amount of time of one another. In some embodiments, computer system 101 creates groups virtual ink representations that correspond to different edges of a same physical or virtual object. For example, computer system 101 optionally automatically groups one or more non-contiguous representations of virtual ink, without detecting one or more inputs expressly requesting a grouping of the representations of virtual ink.

FIGS. 3M-3P illustrate embodiments of translation, scaling, and rotation of visual representations of tracing according to embodiments of the disclosure. In FIG. 3M, computer system 101 is optionally in communication with device 303, which optionally includes one or more sensors described with reference to the devices described with reference to FIG. 2, such as a touch-sensitive surface including one or more touch sensors. In some embodiments, the computer system detects a selection of highlight 322. For example, the computer system optionally detects a contact of hand 305 on the touch-sensitive surface of device 303 while cursor 324 is directed to highlight 322, a gaze of a user operating the computer system, a selection using another pointing and/or cursor device (e.g., device 306), and/or an air gesture such as an air pinching gesture directed toward highlight 322, and in response, selects highlight 322. It is understood that the computer system optionally detects additional and/or alternative inputs, such as the inputs performed by object 308, device 303, and/or indications of such inputs, and performs the one or more operations described with reference to device 303 and/or hand 305. For example, the computer system optionally detects an air gesture performed by object 308 directed to highlight 322, and performs one or more manipulation operations (e.g., translation, scaling, and/or rotation) described herein. It is understood that highlight 322 is optionally representative of a grouping of a plurality of representations of tracing (e.g., non-contiguous instances of virtual ink), that are modified concurrently, and optionally maintain a relative spatial relationship.

In some embodiments, the computer system detects one or more inputs and/or one or more indications of an input (e.g., received from device 303) including a request to manipulate a visual representation of tracing, such movement of contact between hand 305 on device 303 moving highlight 322. For example, device 303 detects an input including a request to translate (e.g., move) highlight 322, including contact between hand 305 and a touch-sensitive surface of device 303 while a cursor 324 is directed to highlight 322. As shown in FIG. 3N, in response to the input including movement of hand 305 contacting device 303, computer system 101 displays highlight 322 at an updated position in accordance with the request to translate highlight 322 (e.g., in a direction and/or based on the amount of movement of the contact made by hand 305). In some embodiments, after translating highlight 322, the computer system maintains display of highlight 322 at the translated position (e.g., no longer aligned with the dimensions of sofa 304).

From FIG. 3N to FIG. 3O, the computer system detects one or more inputs to scale the representation of tracing. For example, while highlight 322 is selected, computer system 101 optionally detects movement of a contact between hand 305 and device 303 corresponding to a request to scale the dimensions of highlight 322. In some embodiments, the dimensions of highlight 322 are scaled (e.g., downwards) relative to the three-dimensional environment while a position of highlight 322 is maintained. In some embodiments, although not illustrated, the computer system 101 optionally detects a different one or more inputs including a request to scale up the dimensions of highlight 322, and in response, enlarges the dimensions of highlight 322 relative to the three-dimensional environment.

From FIG. 3O to FIG. 3P, the computer system detects one or more inputs to rotate the representation of tracing relative to the three-dimensional environment. For example, in FIG. 3O, the computer system detects movement of a contact (optionally the same or different from the contact shown in FIG. 3M) between hand 305 and device 303, and as shown in FIG. 3P, rotates highlight 322 in response to the movement of the contact. In some embodiments, the amount of rotation of highlight 322 is based on the movement of the contact. For example, a first magnitude of movement optionally corresponds to a first degree of rotation of highlight 322, and a second, different magnitude of movement optionally corresponds to a second, different degree of rotation of highlight 322. Additionally or alternatively, a direction of movement of the contact optionally corresponds to a direction and/or axis of rotation of highlight 322. For example, in response to detecting movement of the contact that opposes the movement of hand 305 from FIG. 3O to FIG. 3P (e.g., leftward movement), computer system 101 optionally rotates highlight 322 in an opposite direction.

Although not illustrated, in some embodiments, the computer system displays the representation of tracing without displaying a representation of a corresponding object that was traced to generate the representation of tracing. For example, the computer system optionally detects a movement of the highlight 322 to an updated position within the three-dimensional environment, and optionally concurrently detects movement of the current viewpoint of the user to an updated viewpoint, such that highlight 322 at is updated position is optionally visible, and sofa 304 is optionally no longer within a field-of-view of the computer system (e.g., not displayed via the display generation component 120).

In some embodiments, the computer system displays one or more virtual objects and displays one or more visual representations of tracing of the one or more virtual objects. It is understood that one or more characteristics of the embodiments described with reference to a virtual object and/or the one or more virtual objects optionally have one or more characteristics of the embodiments described with reference to tracing and/or manipulating a physical object and/or one or more physical objects, some embodiments describing tracing of physical object(s) have one or more characteristics of the embodiments describing tracing of virtual object(s).

In some embodiments, computer system 101 performs one or more direct tracing operations. Such direct tracing operations optionally include detecting an input object physically contacting a one or more portions of a physical object and/or making simulated direct contact with one or more portions of a virtual object. FIGS. 3Q-3U illustrates embodiments of such direct tracing operations. Although the embodiments described and illustrated in FIGS. 3Q-3U are directed to a virtual object, it is understood that direct tracing of one or physical objects optionally have one or more characteristics of direct tracing of virtual object(s).

In some embodiments, computer system 101 performs one or more direct tracing operations including optionally detecting physical or apparent contact between an input object (e.g., device 306 and/or object 308) and a target object, and optionally displaying one or more visual representations of tracing based on the contact. Such tracing operations are referred to herein as "direct tracing" of the target object. For example, computer system 101 optionally detects and/or receives an indication of detected contact between a portion of device 306 and sofa 304. For example, device 306 optionally includes one or more sensors described with reference to FIG. 2 to detect contact between device 306 and a tracing target object, such as sofa 304. In response to detecting the contact, device 306 optionally communicates an indication of the contact to computer system 101. In some embodiments, computer system 101 itself detects the contact between device 306 and sofa 304, such as via one or more image sensors (e.g., cameras). In some embodiments, computer system 101 combines depth information of sofa 304, depth information and/or additional kinematic information associated with device 306, and/or force information received from device 306, to determine one or more positions and/or visual characteristics of virtual ink displayed in response to direct tracing corresponding to the contact between device 306 and sofa 304. In accordance with a determination that an input satisfies one or more criteria, including a criterion (e.g., a first criterion) that is satisfied when an input object such as device 306 optionally contacts a target object, the computer system optionally displays a visual representation of tracing based on the depth information of the target object and the kinematic information of the moving contact (e.g., the visual representation is displayed at a location corresponding to a depth of the physical object relative to the viewpoint of the user and/or computer system). In some embodiments, while in the direct tracing mode, if contact is not made between an input object (e.g., device 306) and a respective surface of a target object, the computer system forgoes display of a visual representation of tracing. In some embodiments, if an input (e.g., a contact between a finger of the user and a housing of device 306) is not maintained or detected while an input object directly traces an object, the computer system 101 forgoes display of virtual ink in response to detecting contact or simulated contact with the object.

In some embodiments, when generating the visual representations of tracing, one or more tracing anchors are established to facilitate direct tracing operations. For example, a first tracing anchor optionally corresponding to a first contact between sofa 304 defines a starting point of a visual representation of tracing, and a respective portion of an input object optionally defines an ending point of the visual representation of tracing until an input establishing a tracing anchor corresponding to an ending point of the visual representation of tracing is received.

In FIG. 3Q, computer system 101 detects movement of virtual couch 311. As described previously, in some embodiments, the computer system optionally detects a selection input directed to an object (e.g., a physical and/or a virtual object), as indicated by cursor 324 and by a contact between hand 305 and a touch-sensitive surface of device 303. While virtual couch 311 is selected, computer system 101 optionally further detects one or more inputs to manipulate the virtual couch. From FIG. 3Q to FIG. 3R, the computer system 101 detects one or more inputs including movement of the contact between hand 305 and device 303, and translates a position of virtual couch 311. In FIG. 3R, in response to the one or more input include the movement of the contact, virtual couch 311 optionally is translated within the three-dimensional environment from its initial position as shown in FIG. 3Q, to its updated position suspended above the floor of the physical environment.

In FIG. 3R, device 306 makes apparent contact with a portion of virtual couch 311. For example, while device 306 is oriented toward the lower-left corner of virtual couch 311, device 306 is optionally moved to a position within three-dimensional environment 302 corresponding to a corner of virtual couch 311. In response to detecting such a movement, because computer system 101 optionally determines that device 306 makes simulated contact (e.g., is within a threshold distance of a simulated position of the corner of virtual couch 311), computer system 101 optionally establishes a tracing anchor at the lower-left corner of the virtual couch 311.

In some embodiments, the one or more inputs establishing a tracing anchor optionally includes detecting contact of the input object(s) on a portion of a physical object. For example, the computer system 101 optionally establishes a tracing anchor at a position corresponding to a physical contact between a portion (e.g., tip) of device 306 and a physical object, such as a physical couch.

After the tracing anchor is established, and in response to subsequent movement of the device 306, the computer system 101 optionally displays a representation of tracing (e.g., virtual ink) extending from the location of the tracing anchor to a position corresponding to device 306, such as a projection of a tip of device 306 on to a position within the three-dimensional environment, and/or toward the tip of device 306 itself. At this point, before an ending tracing anchor is established, the virtual ink optionally tracks the tip of device 306, without remaining overlaid upon a portion of virtual couch 311.

Figure 3S:
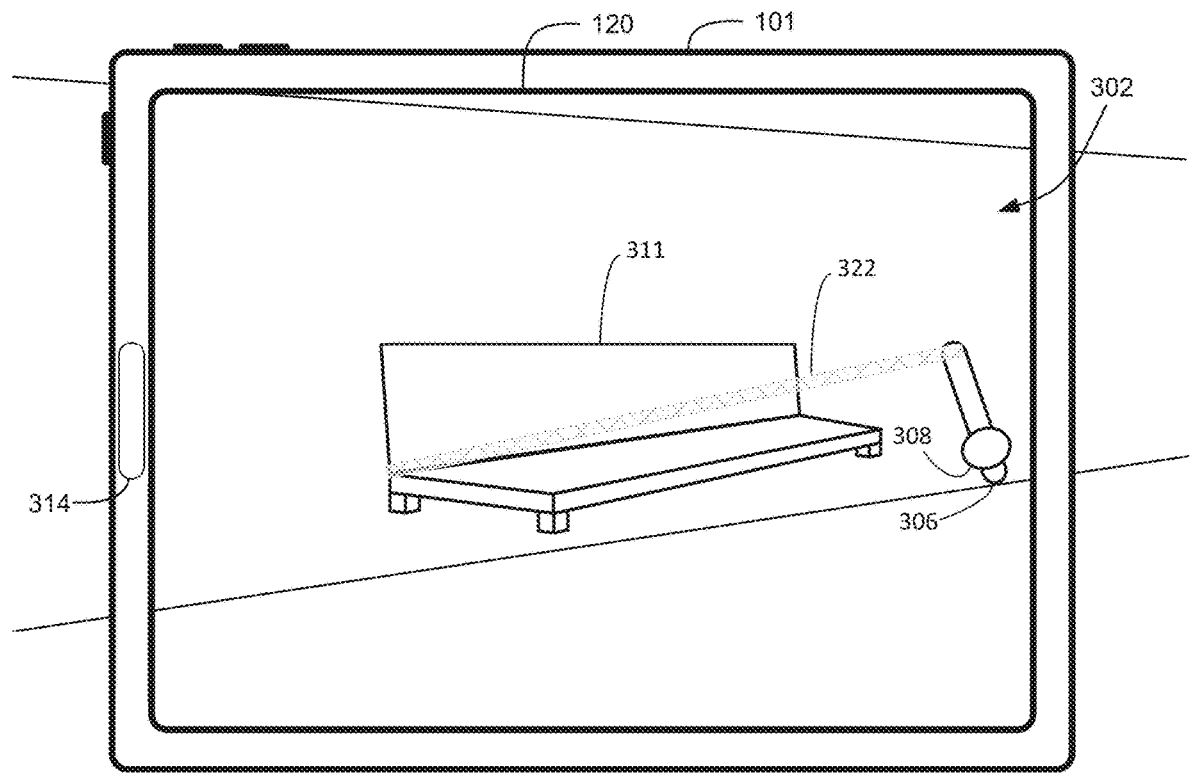
Figure 3U:
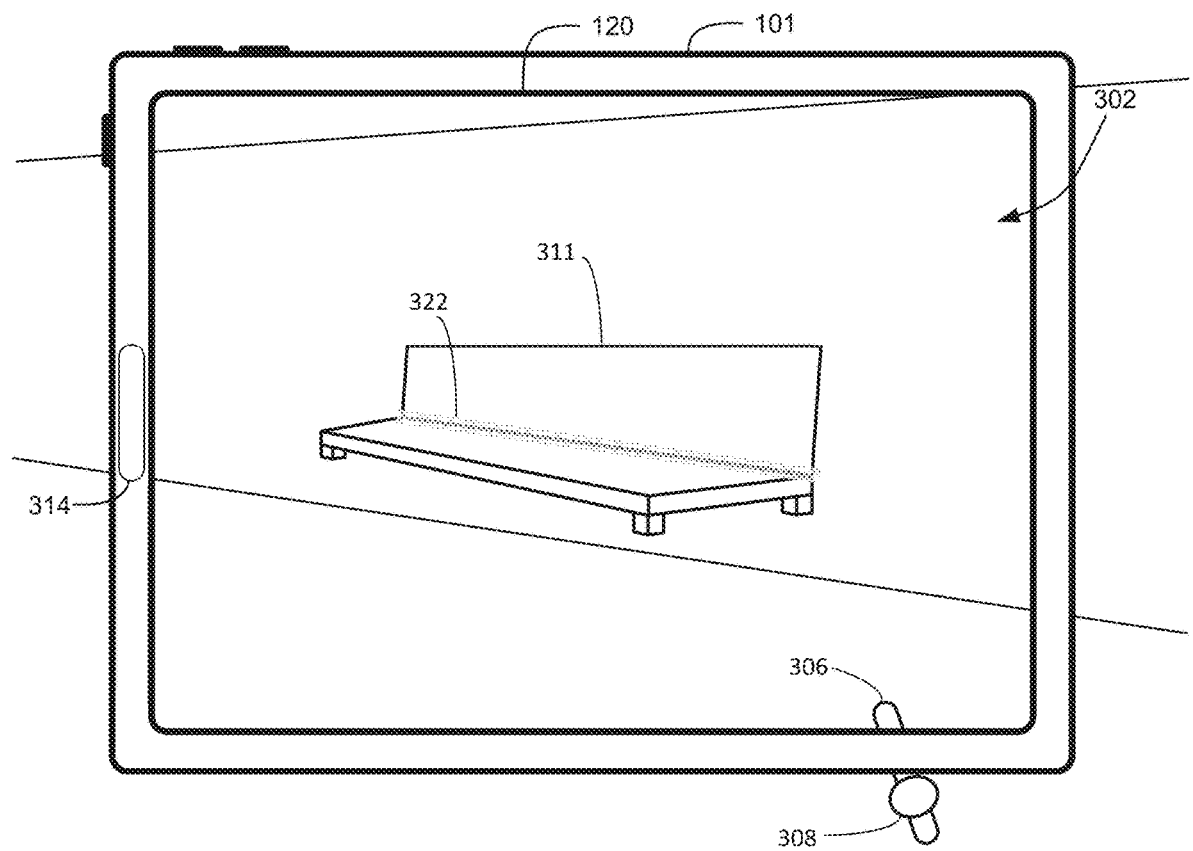

In FIG. 3S, highlight 322 extends from a first, beginning tracing anchor established as shown in FIG. 3R to the tip of device 306.

In FIG. 3T, device 306 is oriented toward the lower-right corner of virtual couch 311, when contact 310 is received at device 306, corresponding to an input to establish a second anchor of highlight 322. It is understood that contact 310 is representative of a simulated contact, and that in some embodiments, device 306 establishes a second anchor in response to a physical contact between device 306 and a physical object, or in response to a simulated contact between device 306 and virtual couch 311 (e.g., movement of device 306 to a position within a threshold distance of a simulated position of the virtual couch). In response to the contact 310, computer system 101 establishes a second tracing anchor corresponding to an ending point of highlight 322, tethering the position and the orientation of highlight 322 to the starting tracing anchor and the ending tracing anchor, rather than the starting tracing anchor and the tip of device 306. Accordingly, in response to detecting movement of device 306 away from its position as shown in FIG. 3T, computer system 101 optionally forgoes display of highlight 322 tracking the device 306 (e.g., the device 306) and maintains display of highlight 322 at its position and orientation as illustrated in FIG. 3T. As an example, from FIG. 3T to FIG. 3U, the computer system detects the current viewpoint of the user shift (e.g., detects the user move). Although device 306 has changed in position and orientation relative to the established tracing anchor(s), highlight 322 is optionally maintained with a position and/or orientation tracing a portion of virtual couch 311. Moreover, despite detecting a shift in current viewpoint of the user, highlight 322 is displayed at a location that is locked relative to virtual couch 311 and/or the three-dimensional environment of the user of the computer system 101. For example, in response to detecting the shift in current viewpoint, the computer system 101 optionally displays highlight 322 with an updated orientation from the perspective of the current viewpoint to mimic the appearance of a physical object having the size, dimensions, position, and/or orientation of highlight 322 as the user walks around the physical object.

In some embodiments, while displaying a visual representation of tracing having a first tracing anchor and a second tracing anchor, the computer system detects an additional input to initiate tracing starting from the first or second tracing anchor. In response to detecting the additional input, the computer system optionally displays an additional visual representation of tracing (e.g., another segment of virtual ink similar to highlight 322). The additional visual representation of tracing optionally initiates from the first or the second tracing anchor, and in response to detecting physical contact (e.g., with a physical couch) or simulated contact (e.g., with virtual couch 311) tethers the additional representation of tracing to an ending tracing anchor placed at the position of physical or simulated contact on a target object. In some embodiments, when the first or the second tracing anchor is tethered to the additional visual representation of tracing, the first visual representation (e.g., highlight 322) and the second visual representation of tracing (e.g., the additional visual representation of tracing) are contiguous, forming a vertex between the first and the second visual representations. As described further with reference to FIGS. 3V-3X, in some embodiments, a plurality of visual representations of tracing are non-contiguous.

FIG. 3V illustrates embodiments of a user interface for object tracing and manipulation according to embodiments of the disclosure. In some embodiments, the computer system concurrently detects input(s) to manipulate objects (e.g., virtual objects) and detects input(s) to display visual representations of tracing. For example, computer system 101 displays virtual couch 311 and a first highlight 322a corresponding to a visual representation of tracing. In FIG. 3V, device 306 is positioned making simulated contact with virtual couch 311. In response to one or more inputs moving virtual couch 311—corresponding to contact between hand 305 and device 303 as indicated by cursor 324—the virtual couch is moved leftward, as shown by the updated position of virtual couch 311 as shown in FIG. 3W. Concurrent with the one or more input(s) moving the virtual couch, computer system 101 optionally detects direct tracing including contact 310 on a housing of device 306 while device 306 is oriented toward a portion of virtual couch 311, and rightward movement of device 306 from as shown in FIG. 3V to as shown in FIG. 3W, mimicking a sliding of a physical object while device 306 is contacting an edge of the physical object. In response to the direct tracing operations including movement of virtual couch 311, computer system 101 displays highlight 322b.

In some embodiments, the computer system 101 displays a visual representation of tracing, such as highlight 322b, that is non-contiguous with another, currently displayed visual representation of tracing, such as highlight 322a. In some embodiments, the visual representation of tracing is displayed at a respective position relative to an object based on movement of an input object (e.g., device 306 and/or object 308) and additionally or alternatively based on apparent movement (e.g., of a virtual object) and/or physical movement (e.g., of a physical object) of a target object within the three-dimensional environment. For example, highlight 322b is optionally displayed at a position, with a size, and/or orientation corresponding to an edge of virtual couch 311 based on the apparent leftward movement of virtual couch 311 and the rightward movement of device 306 relative to virtual couch while the tracing operation(s) are ongoing.

In some embodiments, the computer system detects apparent or physical movement of a target object, such as a rotation of a virtual and/or physical object, and/or a scaling of a virtual object, concurrent with one or more tracing operations, and displays a visual representation based on the apparent physical and/or movement of the target object. In some embodiments, the computer system 101 uses depth information to maintain an understanding of a presence of a traced edge while rotating the object. For example, the computer system optionally detects a tracing operation around initiate at a first position of a circular edge of a physical or virtual cylinder. While the tracing operation is ongoing, the computer system optionally detects a position of an input object (e.g., device 306) maintained at a position and/or orientation corresponding to the circular edge of the cylinder while concurrently detecting a rotation of the cylinder. In response to the detecting the rotation of the cylinder, the computer system optionally displays a visual of representation of tracing outlining the circular edge of the cylinder based on the amount of rotation of the cylinder. As a comparable physical example, such rotation and tracing optionally corresponds to holding the tip of a paintbrush at a fixed position and orientation against a lip of a physical tin can; in response to rotating the physical can, the tip of the paintbrush deposits paint that traces the lip of the can, based on the rotation of the can.

In some embodiments, the computer system groups one or more visual representations of highlights. For example, the computer system optionally detects an succession of inputs directed to respective virtual objects (e.g., highlights) while a virtual or physical button is actuated, and optionally adds the respective virtual objects to a group of virtual objects. In FIG. 3W, the computer system optionally has grouped highlight 322a and highlight 322b, and detects one or more inputs including movement of a contact between hand 305 and device 303 corresponding to a request to move the group include highlight 322a and highlight 322b. It is understood that grouping of virtual representations of tracing and manipulation of groups of visual representations of tracing optionally have one or more characteristics of the inputs (e.g., selection inputs, inputs associated with tracing operations), such as grouping based on one or more air gestures and/or based on interactions with or more input objects.

In FIG. 3X, in response to the one or more inputs requesting movement of the group, the group of highlight 322a and 322b are moved (e.g., translated) within the three-dimensional environment, while a current viewpoint of the user moves away from a world-locked position of virtual couch 311. In some embodiments, the respective visual representations of tracing of a group maintain a relative spatial arrangement in response to manipulations (e.g., scaling, rotation, and/or translation) of the group. For example, computer system 101 concurrently moves highlight 322a and highlight 322b in response to movement of hand 305 across a surface of device 303, maintaining a relative spacing, scale, and orientation of highlight 322a relative to highlight 322b. Maintaining the spatial arrangement of the group can be beneficial when inspecting the tracing of a target object (e.g., virtual couch 311, and/or a physical object), when exporting data representative of the spatial arrangement of the tracing to applications installed on and/or external to the computer system, and/or manipulating one or more portions of the group.

Therefore, according to the above, some examples of the disclosure are directed to a method performed at an electronic device in communication with one or more input devices and a display device, comprising while an object is visible from a first viewpoint of the electronic device, receiving, via the one or more input devices, a first input initiating a tracing operation directed to the object, while performing the tracing operation, detecting, via the one or more input devices, a second input, different from the first input, including movement of an input object, wherein the input object is different from the object, in response to detecting the second input, in accordance with a determination that the second input satisfies one or more criteria, including a first criterion that is satisfied when the movement of the input object includes a first movement corresponding to a first surface of the object, displaying, via the display device, a representation of tracing of the first surface in accordance with the first movement and corresponding to the first surface of the object, wherein the first surface is detected based on depth information associated with the first surface relative to the three-dimensional environment. Additionally or alternatively to one or more of the examples disclosed above, in some examples, the method further comprises in accordance with a determination that the second input does not satisfy the one or more criteria, forgoing the displaying of the representation of tracing of the respective surface. Additionally or alternatively to one or more of the examples disclosed above, in some examples, the method further comprises in response to detecting the second input, in accordance with a determination that the second input satisfies one or more second criteria, different from the one or more criteria, including a second criterion that is satisfied when a current position of the input object corresponds to the first surface of the object, displaying, via the display device, a visual indication corresponding to a candidate edge of the object, wherein the visual indication corresponding to the candidate edge of the object is displayed along at least a portion of the corresponding candidate edge. Additionally or alternatively to one or more of the examples disclosed above, in some examples the movement corresponds to a first edge of the first surface of the object and the representation of tracing of the first surface corresponds to the first edge. Additionally or alternatively to one or more of the examples disclosed above, in some examples the representation of tracing follows a contour of the surface that is visible from the first viewpoint. Additionally or alternatively to one or more of the examples disclosed above, in some examples the one or more criteria include a second criterion, different from the first criterion, that is satisfied when the movement of the input object is within a threshold distance of the first surface of the object. Additionally or alternatively to one or more of the examples disclosed above, in some examples the depth information includes information describing respective depths of one or more portions of the first surface relative to the three-dimensional environment, and wherein the depth information is based on one or more outputs of one or more image filters. Additionally or alternatively to one or more of the examples disclosed above, in some examples the one or more filters include one or more depth filters and one or more line filters. Additionally or alternatively to one or more of the examples disclosed above, in some examples, the method further comprises in response to the first input, displaying, via the display device, a visual indication of a region of depth evaluation of the three-dimensional environment. Additionally or alternatively to one or more of the examples disclosed above, in some examples, in response to the second input, the visual indication corresponds to a respective region of the three-dimensional environment that is evaluated to detect the depth information associated with the first surface of the object relative to the three-dimensional environment. Additionally or alternatively to one or more of the examples disclosed above, in some examples the method further comprises while displaying, via the display device, the visual indication, detecting, via the one or more input devices, a third input, different from the first input and the second input, corresponding to a request to modify a scale of the visual indication and in response to detecting the third input, modifying the scale of the visual indication in accordance with the third input. Additionally or alternatively to one or more of the examples disclosed above, in some examples, in response to detecting the second input, in accordance with a determination that the second input satisfies one or more second criteria, different from the one or more criteria, including a second criterion that is satisfied when a current position of the input object corresponds to the first surface of the object, displaying, via the display device, a visual indication corresponding to the current position of the input object relative to the first surface of the object. Additionally or alternatively to one or more of the examples disclosed above, in some examples, the method further comprises in response to detecting the second input in accordance with the determination that the second input does not satisfy the one or more criteria, and in accordance with a determination that the second input satisfies one or more second criteria, different from the one or more criteria, displaying, via the display device, a second representation of tracing, different from the representation of tracing of the first surface, in accordance with the movement of the input object, wherein the second representation of tracing follows a path of the first movement. In some examples, while detecting, via the one or more input devices, the second input and while displaying the second representation of tracing, detecting a third input, different from the first input and the second input, and in response to detecting the third input, in accordance with a determination that the third input satisfies the one or more criteria, a second portion of the representation of tracing of the first surface, wherein the second portion is contiguous with the second representation of tracing. Additionally or alternatively to one or more of the examples disclosed above, in some examples, the method further comprises in accordance with the determination that the second input does not satisfy the one or more criteria, displaying, via the display device, a second representation of the tracing, different from the representation of tracing of the respective surface, in accordance with the first movement. Additionally or alternatively to one or more of the examples disclosed above, in some examples the method further comprises in accordance with the determination that the second input does not satisfy the one or more criteria, and in accordance with a determination that the second input satisfies one or more second criteria, different from the one or more criteria, including a second criterion, different from the first criterion, that is satisfied when the movement of the input object includes a first movement corresponding to a second surface of the object, different from the first surface of the object, displaying, via the device, a second representation of tracing of the first surface in accordance with the first movement corresponding to the second surface, wherein the second surface is detected based on respective depth information associated with the second surface relative to the three-dimensional environment. Additionally or alternatively to one or more of the examples disclosed above, in some examples the method further comprises while displaying the representation of tracing, detecting, via the one or more input devices, a third input, different from the first and the second input, corresponding to a request to modify the display of the representation, and in response to the third input, modifying the representation of tracing in accordance with the third input. Additionally or alternatively to one or more of the examples disclosed above, in some examples, the input object corresponds to an input device of the one or more input devices. Additionally or alternatively to one or more of the examples disclosed above, in some examples the object is a physical object in the three-dimensional environment. Additionally or alternatively to one or more of the examples disclosed above, in some examples the object is a virtual object in the three-dimensional environment. Additionally or alternatively to one or more of the examples disclosed above, in some examples, the method further comprises while displaying the representation of tracing, detecting, via the one or more input devices, a third input, different from the first and the second input, corresponding to a request to modify the display of the representation, and in response to the third input, modifying the representation of tracing in accordance with the third input.

Some examples of the disclosure are directed to an electronic device in communication with one or more input devices and a display device comprising one or more processors, memory storing one or more programs configured to be executed by the one or more processors, and the one or more programs include instructions for while an object is visible from a first viewpoint of the electronic device, receiving, via the one or more input devices, a first input initiating a tracing operation directed to the object, while performing the tracing operation, detecting, via the one or more input devices, a second input, different from the first input, including movement of an input object, wherein the input object is different from the object in response to detecting the second input, in accordance with a determination that the second input satisfies one or more criteria, including a first criterion that is satisfied when the movement of the input object includes a first movement corresponding to a first surface of the object, displaying, via the display device, a representation of tracing of the first surface in accordance with the first movement and corresponding to the first surface of the object, wherein the first surface is detected based on depth information associated with the first surface relative to the three-dimensional environment.

Some examples of the disclosure are directed to a non-transitory computer readable medium storing one or more programs configured to be executed by one or more processors of an electronic device that is in communication with one or more input devices and a display device, the one or more programs including instructions for while an object is visible from a first viewpoint of the electronic device, receiving, via the one or more input devices, a first input initiating a tracing operation directed to the object, while performing the tracing operation, detecting, via the one or more input devices, a second input, different from the first input, including movement of an input object, wherein the input object is different from the object in response to detecting the second input, in accordance with a determination that the second input satisfies one or more criteria, including a first criterion that is satisfied when the movement of the input object includes a first movement corresponding to a first surface of the object, displaying, via the display device, a representation of tracing of the first surface in accordance with the first movement and corresponding to the first surface of the object, wherein the first surface is detected based on depth information associated with the first surface relative to the three-dimensional environment.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

The invention claimed is:

1. A method comprising:
at an electronic device in communication with one or more input devices and a display device:
while an object is visible from a first viewpoint of the electronic device, receiving, via the one or more input devices, a first input initiating a tracing operation directed to the object;
while performing the tracing operation, detecting, via the one or more input devices, a second input, different from the first input, including movement of an input object, wherein the input object is different from the object; and
in response to detecting the second input:
in accordance with a determination that the second input satisfies one or more criteria, including a first criterion that is satisfied when the movement of the input object includes a first movement corresponding to a first surface of the object, displaying, via the display device, a representation of tracing of the first surface in accordance with the first movement and corresponding to the first surface of the object, wherein the first surface is detected based on depth information associated with the first surface relative to a three-dimensional environment, and wherein the depth information is at least partially detected using one or more depth sensors.

2. The method of claim 1, further comprising:
in accordance with a determination that the second input does not satisfy the one or more criteria, forgoing the displaying of the representation of tracing of the first surface.

3. The method of claim 1, further comprising:
in response to detecting the second input, in accordance with a determination that the second input satisfies one or more second criteria, different from the one or more criteria, including a second criterion that is satisfied when a current position of the input object corresponds to the first surface of the object, displaying, via the display device, a visual indication corresponding to a candidate edge of the object, wherein the visual indication corresponding to the candidate edge of the object is displayed along at least a portion of the corresponding candidate edge.

4. The method of claim 1, wherein the movement corresponds to a first edge of the first surface of the object and the representation of tracing of the first surface corresponds to the first edge.

5. The method of claim 1, wherein the depth information includes information describing respective depths of one or more portions of the first surface relative to the three-dimensional environment, and wherein the depth information is based on one or more outputs of one or more image filters.

6. The method of claim 1, further comprising:
in response to the first input, displaying, via the display device, a visual indication of a region of depth evaluation of the three-dimensional environment.

7. The method of claim 1, further comprising:
in response to detecting the second input, in accordance with a determination that the second input satisfies one or more second criteria, different from the one or more criteria, including a second criterion that is satisfied when a current position of the input object corresponds to the first surface of the object, displaying, via the display device, a visual indication corresponding to the current position of the input object relative to the first surface of the object.

8. The method of claim 1, further comprising:
while displaying the representation of tracing, detecting, via the one or more input devices, a third input, different from the first and the second input, corresponding to a request to modify the display of the representation; and
in response to the third input, modifying the representation of tracing in accordance with the third input.

9. An electronic device in communication with one or more input devices and a display device comprising:
one or more processors;
memory storing one or more programs configured to be executed by the one or more processors, wherein the one or more programs include instructions for:
while an object is visible from a first viewpoint of the electronic device, receiving, via the one or more input devices, a first input initiating a tracing operation directed to the object;
while performing the tracing operation, detecting, via the one or more input devices, a second input, different from the first input, including movement of an input object, wherein the input object is different from the object; and
in response to detecting the second input:
in accordance with a determination that the second input satisfies one or more criteria, including a first criterion that is satisfied when the movement of the input object includes a first movement corresponding to a first surface of the object, displaying, via the display device, a representation of tracing of the first surface in accordance with the first movement and corresponding to the first surface of the object, wherein the first surface is detected based on depth information associated with the first surface relative to a three-dimensional environment, and wherein the depth information is at least partially detected using one or more depth sensors.

10. The electronic device of claim 9, wherein the one or more programs further include instructions for:
in response to detecting the second input, in accordance with a determination that the second input satisfies one or more second criteria, different from the one or more criteria, including a second criterion that is satisfied when a current position of the input object corresponds to the first surface of the object, displaying, via the display device, a visual indication corresponding to a candidate edge of the object, wherein the visual indication corresponding to the candidate edge of the object is displayed along at least a portion of the corresponding candidate edge.

11. The electronic device of claim 9, wherein the movement corresponds to a first edge of the first surface of the object and the representation of tracing of the first surface corresponds to the first edge.

12. The electronic device of claim 9, wherein the depth information includes information describing respective depths of one or more portions of the first surface relative to the three-dimensional environment, and wherein the depth information is based on one or more outputs of one or more image filters.

13. The electronic device of claim 9, wherein the one or more programs further include instructions for:
in response to the first input, displaying, via the display device, a visual indication of a region of depth evaluation of the three-dimensional environment.

14. The electronic device of claim 9, wherein the one or more programs further include instructions for:
in response to detecting the second input, in accordance with a determination that the second input satisfies one or more second criteria, different from the one or more criteria, including a second criterion that is satisfied when a current position of the input object corresponds to the first surface of the object, displaying, via the display device, a visual indication corresponding to the current position of the input object relative to the first surface of the object.

15. The electronic device of claim 9, wherein the one or more programs further include instructions for;
while displaying the representation of tracing, detecting, via the one or more input devices, a third input, different from the first and the second input, corresponding to a request to modify the display of the representation; and
in response to the third input, modifying the representation of tracing in accordance with the third input.

16. A non-transitory computer readable medium storing one or more programs configured to be executed by one or more processors of an electronic device that is in communication with one or more input devices and a display device, the one or more programs including instructions for:
while an object is visible from a first viewpoint of the electronic device, receiving, via the one or more input devices, a first input initiating a tracing operation directed to the object;
while performing the tracing operation, detecting, via the one or more input devices, a second input, different from the first input, including movement of an input object, wherein the input object is different from the object; and
in response to detecting the second input:
in accordance with a determination that the second input satisfies one or more criteria, including a first criterion that is satisfied when the movement of the input object includes a first movement corresponding to a first surface of the object, displaying, via the display device, a representation of tracing of the first surface in accordance with the first movement and corresponding to the first surface of the object, wherein the first surface is detected based on depth information associated with the first surface relative to a three-dimensional environment, and wherein the depth information is at least partially detected using one or more depth sensors.

17. The non-transitory computer readable medium of claim 16, wherein the one or more programs further include instructions for:
in response to detecting the second input, in accordance with a determination that the second input satisfies one or more second criteria, different from the one or more criteria, including a second criterion that is satisfied when a current position of the input object corresponds to the first surface of the object, displaying, via the display device, a visual indication corresponding to a candidate edge of the object, wherein the visual indication corresponding to the candidate edge of the object is displayed along at least a portion of the corresponding candidate edge.

18. The non-transitory computer readable medium of claim 16, wherein the movement corresponds to a first edge of the first surface of the object and the representation of tracing of the first surface corresponds to the first edge.

19. The non-transitory computer readable medium of claim 16, wherein the depth information includes information describing respective depths of one or more portions of the first surface relative to the three-dimensional environment, and wherein the depth information is based on one or more outputs of one or more image filters.

20. The non-transitory computer readable medium of claim 16, wherein the one or more programs further include instructions for:
   in response to the first input, displaying, via the display device, a visual indication of a region of depth evaluation of the three-dimensional environment.

* * * * *